(12) United States Patent
Toke-Nichols

(10) Patent No.: US 9,514,222 B2
(45) Date of Patent: *Dec. 6, 2016

(54) ACCESSING STORED ELECTRONIC RESOURCES

(71) Applicant: Cloudfind Ltd., Bath (GB)

(72) Inventor: Sebastian Toke-Nichols, Bath (GB)

(73) Assignee: Cloudfind Ltd., Bath (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,989

(22) Filed: Aug. 4, 2014

(65) Prior Publication Data

US 2014/0379720 A1    Dec. 25, 2014

Related U.S. Application Data

(63) Continuation of application No. 13/515,146, filed as application No. PCT/GB2010/002259 on Dec. 10, 2010, now Pat. No. 9,002,851.

(30) Foreign Application Priority Data

Dec. 10, 2009   (GB) ...................................... 0921669

(51) Int. Cl.
    *G06F 17/30* (2006.01)

(52) U.S. Cl.
    CPC ..... *G06F 17/3071* (2013.01); *G06F 17/30091* (2013.01); *G06F 17/30705* (2013.01); *G06F 17/30958* (2013.01)

(58) Field of Classification Search
    CPC .................... G06F 17/30091; G06F 17/30705; G06F 17/3071; G06F 17/30958
    See application file for complete search history.

(56) References Cited

U.S. PATENT DOCUMENTS

2003/0115218 A1   6/2003  Bobbitt et al.
2003/0144996 A1*  7/2003  Moore, Jr. ........ G06F 17/30864
(Continued)

FOREIGN PATENT DOCUMENTS

WO    9412944 A1    6/1996
WO    9839700 A2    9/1998

OTHER PUBLICATIONS

International Search Report dated Mar. 8, 2011 from corresponding International Patent Application No. PCT/GB2010/002259; 2 pgs.

*Primary Examiner* — William Spieler
(74) *Attorney, Agent, or Firm* — Maier & Maier, PLLC

(57) ABSTRACT

A method for configuring a computer system to provide access to stored electronic resources may be described. The method can include determining a topic framework between stored electronic resources and topic names by determining topic names for topic framework by generating topic names based on names assigned to storage sets and generating topic names based on attributes of resources. Further forming associations between resources and topic names by associating resources with topic names generated based a storage set and associating resources having attributes with topic names generated based on attributes of the resources. Also, storing the framework to provide structure so resources can be accessed using the topic names and using the topic framework to present a group of stored resources associated with topic names so that the group of resources can be selected for access.

22 Claims, 49 Drawing Sheets

(56) References Cited

U.S. PATENT DOCUMENTS

| | | |
|---|---|---|
| 2005/0289138 A1 | 12/2005 | Cheng et al. |
| 2007/0208733 A1 | 9/2007 | Brault |
| 2007/0255677 A1 | 11/2007 | Alexander et al. |
| 2007/0294252 A1 | 12/2007 | Fetterly et al. |
| 2009/0083852 A1* | 3/2009 | Kuo ............... G06F 21/564 726/22 |
| 2009/0100109 A1 | 4/2009 | Turski et al. |
| 2009/0112859 A1 | 4/2009 | Dehlinger |
| 2010/0097494 A1 | 4/2010 | Gum et al. |

* cited by examiner

| Name | Resource | Location |
|------|----------|----------|
|      |          |          |
|      |          |          |
|      |          |          |
|      |          |          |
|      |          |          |
|      |          |          |

| Name | Level | Preceding Topic | Type | Parent | Resources | Location |
|------|-------|-----------------|------|--------|-----------|----------|
|      |       |                 |      |        |           |          |
|      |       |                 |      |        |           |          |
|      |       |                 |      |        |           |          |
|      |       |                 |      |        |           |          |
|      |       |                 |      |        |           |          |

| Name | Level | Preceding Topic | Resources | Location |
|---|---|---|---|---|
| Skiing | Level 1 | | Smith skiing Holiday 2008.doc | C:\...... |
| Skiing | Level 1 | | Snow White Ski Routes.pdf | C:\...... |
| Skiing | Level 1 | | Skiing brochure 2009.pdf | C:\...... |
| Accounts | Level 1 | | US Accounts.xls | C:\...... |
| Accounts | Level 1 | | Canada Accounts.xls | C:\...... |
| Accounts | Level 1 | | Europe Accounts.xls | C:\...... |
| Mountain | Level 1 | | Mountain Guides in France.pdf | C:\...... |
| Mountain | Level 1 | | Mountain Guides in Italy.pdf | C:\...... |
| Mountain | Level 1 | | Mountain Guides in Greece.pdf | C:\...... |
| Mountain | Level 1 | | Photo.jpeg | C:\...... |
| Beach | Level 1 | | Vistas.doc | C:\...... |
| Customers | Level 1 | | | |
| Correspondence | Level 1 | | | |
| Eiger | Level 1 | | | |

FIG. 10

| Topic List | Topic Browser | Resources |
|---|---|---|
| Accounts<br>Beach<br>Correspondence<br>Customers<br>Eiger<br>Mountain<br>Skiing | | US Accounts.xls<br>Canada Accounts.xls<br>Europe Accounts.xls |

FIG. 11

| Name | Level | Preceding Topic | Resources | Location |
|---|---|---|---|---|
| Skiing | Level 1 | | Smith skiing Holiday 2008.doc | C:\... |
| Skiing | Level 1 | | Snow White Ski Routes*.pdf | C:\... |
| Skiing | Level 1 | | Skiing brochure 2009.pdf | C:\... |
| Accounts | Level 1 | | US Accounts.xls | C:\... |
| Accounts | Level 1 | | Canada Accounts.xls | C:\... |
| Accounts | Level 1 | | Europe Accounts.xls | C:\... |
| Mountain | Level 1 | | Mountain Guides in France.pdf | C:\... |
| Mountain | Level 1 | | Mountain Guides in Italy.pdf | C:\... |
| Mountain | Level 1 | | Mountain Guides in Greece.pdf | C:\... |
| Mountain | Level 1 | | Photo.jpeg | C:\... |
| Guides | Level 1 | | Mountain Guides in France.pdf | C:\... |
| Guides | Level 1 | | Mountain Guides in Italy.pdf | C:\... |
| Guides | Level 1 | | Mountain Guides in Greece.pdf | C:\... |
| Guides | Level 1 | | All guides in Greece.pdf | C:\... |
| Customers | Level 1 | | | |
| Correspondence | Level 1 | | | |
| Smith | Level 1 | | | |
| Beach | Level 1 | | Vistas.doc | C:\... |
| Eiger | Level 1 | | | |
| Beach | Level 2 | Smith | | |
| Skiing | Level 2 | Smith | | |

FIG. 15

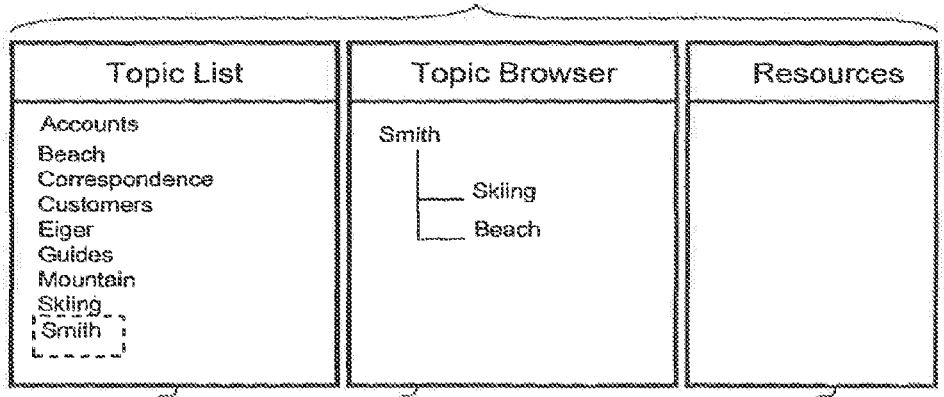

| Name | Level | Preceding | Resources | Location |
|---|---|---|---|---|
| Skiing | Level 1 | | Smith skiing Holiday | C:\.......... |
| Skiing | Level 1 | | Snow White Ski Routes*.pdf | C:\.......... |
| Skiing | Level 1 | | Skiing brochure 2009.pdf | C:\.......... |
| Accounts | Level 1 | | US Accounts.xls | C:\.......... |
| Accounts | Level 1 | | Canada Accounts.xls | C:\.......... |
| Accounts | Level 1 | | Europe Accounts.xls | C:\.......... |
| Mountain | Level 1 | | Mountain Guides in France.pdf | C:\.......... |
| Mountain | Level 1 | | Mountain Guides in Italy.pdf | C:\.......... |
| Mountain | Level 1 | | Mountain Guides in Greece.pdf | C:\.......... |
| Mountain | Level 1 | | Photo.jpeg | C:\.......... |
| Guides | Level 1 | | Mountain Guides in France.pdf | C:\.......... |
| Guides | Level 1 | | Mountain Guides in Italy.pdf | C:\.......... |
| Guides | Level 1 | | Mountain Guides in Greece.pdf | C:\.......... |
| Guides | Level 1 | | All guides in Greece.pdf | C:\.......... |
| Customers | Level 1 | | | |
| Correspondence | Level 1 | | | |
| Smith | Level 1 | | | |
| Beach | Level 1 | | Vistas.doc | C:\.......... |
| Jones | Level 1 | | | |
| Brown | Level 1 | | Brown Details.doc | C:\.......... |
| Eiger | Level 1 | | | |

FIG. 23a

| Name | Level | Preceding Topic | Resources | Location |
|---|---|---|---|---|
| Beach | Level 2 | Smith | | |
| Skiing | Level 2 | Smith | | |
| Brown | Level 2 | Beach | Brown Holiday 2009.doc | C:\......... |
| Beach | Level 2 | Brown | Brown Holiday 2009.doc | C:\......... |
| Jones | Level 2 | Beach | Jones Beach Holiday 2009.doc | C:\......... |
| Jones | Level 2 | Beach | Jones Holiday 2005.doc | C:\......... |
| Beach | Level 2 | Jones | Jones Beach Holiday 2009.doc | C:\......... |
| Beach | Level 2 | Jones | Jones Holiday 2005.doc | C:\......... |
| Skiing in France | Level 2 | Skiing | Skiing in Chamonix.pdf | C:\......... |
| Skiing in Switzerland | Level 2 | Skiing | Skiing in Davos.pdf | C:\......... |
| Eiger | Level 2 | Mountain | Abc123.jpeg | C:\......... |
| Mountain | Level 2 | Eiger | Abc123.jpeg | C:\......... |

| Topic List | Topic Browser | Resources |
|---|---|---|
| Accounts<br>Beach<br>Brown<br>Correspondence<br>Customers<br>Eiger<br>Guides<br>Jones<br>Mountain<br>Skiing<br>Skiing in France<br>Skiing in Switzerland<br>Smith | Jones<br>└── Beach | Jones Beach Holiday 2009.doc<br>Jones Holiday 2005.doc |

FIG. 25

| Topic List | Topic Browser | Resources |
|---|---|---|
| Accounts<br>Beach<br>Brown<br>Correspondence<br>Customers<br>Eiger<br>Guides<br>Jones<br>Mountain<br>Skiing<br>Skiing in France<br>Skiing in Switzerland<br>Smith | Skiing<br>├── Skiing in France<br>└── Skiing in Switzerland | Skiing in Chamonix.pdf |

FIG. 26

| Topic List | Topic Browser | Resources |
|---|---|---|
| Accounts<br>Beach<br>Brown<br>Correspondence<br>Customers<br>Jones<br>Eiger<br>Guides<br>Mountain<br>Skiing<br>Skiing in France<br>Skiing in Switzerland<br>Smith | Skiing<br>├── Skiing in France<br>└── Skiing in Switzerland | Skiing in Davos.pdf |

| | | | | | | ~182 ~184 | ~114 |
|---|---|---|---|---|---|---|---|
| | Name | Level | Preceding | Type | Parent | Resources | Location |
| | Skiing | Level 1 | | | | Smith skiing Holiday | C:\... |
| | Skiing | Level 1 | | | | Snow White Ski Routes*.pdf | C:\... |
| | Skiing | Level 1 | | | | Skiing brochure 2009.pdf | C:\... |
| | Accounts | Level 1 | | | | US Accounts.xls | C:\... |
| | Accounts | Level 1 | | | | Canada Accounts.xls | C:\... |
| | Accounts | Level 1 | | | | Europe Accounts.xls | C:\... |
| | Mountain | Level 1 | | | | Mountain Guides in France.pdf | C:\... |
| | Mountain | Level 1 | | | | Mountain Guides in Italy.pdf | C:\... |
| | Mountain | Level 1 | | | | Mountain Guides in Greece.pdf | C:\... |
| | Mountain | Level 1 | | | | Photo.jpeg | C:\... |
| | Guides | Level 1 | | | | Mountain Guides in France.pdf | C:\... |
| | Guides | Level 1 | | | | Mountain Guides in Italy.pdf | C:\... |
| | Guides | Level 1 | | | | Mountain Guides in Greece.pdf | C:\... |
| | Guides | Level 1 | | | | All guides in Greece.pdf | C:\... |
| 186 | Customers | Level 1 | | entity | | | |
| | Correspondence | Level 1 | | | | | |
| 188 | Smith | Level 1 | | Instance | Customers | | |
| | Beach | Level 1 | | | | Vistas.doc | C:\... |
| 190 | Jones | Level 1 | | Instance | Customers | | |
| 192 | Brown | Level 1 | | Instance | Customers | Brown Details.doc | C:\... |
| | Eiger | Level 1 | | | | | |

FIG. 29a

| Name | Level | Preceding | Type | Parent | Resources | Location |
|---|---|---|---|---|---|---|
| Smith | Level 2 | Customers | Instance | Customers | | |
| Jones | Level 2 | Customers | Instance | Customers | | |
| Brown | Level 2 | Customers | Instance | Customers | | |
| Beach | Level 2 | Smith | | | | |
| Skiing | Level 2 | Smith | | | | |
| Brown | Level 2 | Beach | | | Brown Holiday 2009.doc | C:\... |
| Beach | Level 2 | Brown | | | Brown Holiday 2009.doc | C:\... |
| Jones | Level 2 | Beach | | | Jones Beach Holiday | C:\... |
| Jones | Level 2 | Beach | | | Jones Holiday 2005.doc | C:\... |
| Beach | Level 2 | Jones | | | Jones Beach Holiday | C:\... |
| Beach | Level 2 | Jones | | | Jones Holiday 2005.doc | C:\... |
| Skiing in France | Level 2 | Skiing | | | Skiing in Chamonix.pdf | C:\... |
| Skiing in Switzerland | Level 2 | Skiing | | | Skiing in Davos.pdf | C:\... |
| Eiger | Level 2 | Mountain | | | Abc123.jpeg | C:\... |
| Mountain | Level 2 | Eiger | | | Abc123.jpeg | C:\... |

| Name | Level | Preceding | Type | Parent | Resources | Location |
|---|---|---|---|---|---|---|
| Skiing | Level 1 | | | | Smith skiing Holiday | C:\........ |
| Skiing | Level 1 | | | | Snow White Ski | C:\........ |
| Skiing | Level 1 | | | | Skiing brochure 2009.pdf | C:\........ |
| Accounts | Level 1 | | | | US Accounts.xls | C:\........ |
| Accounts | Level 1 | | | | Canada Accounts.xls | C:\........ |
| Accounts | Level 1 | | | | Europe Accounts.xls | C:\........ |
| Mountain | Level 1 | | | | Mountain Guides in France.pdf | C:\........ |
| Mountain | Level 1 | | | | Mountain Guides in Italy.pdf | C:\........ |
| Mountain | Level 1 | | | | Mountain Guides in Greece.pdf | C:\........ |
| Mountain | Level 1 | | | | Photo.jpeg | C:\........ |
| Guides | Level 1 | | | | Mountain Guides in France.pdf | C:\........ |
| Guides | Level 1 | | | | Mountain Guides in Italy.pdf | C:\........ |
| Guides | Level 1 | | | | Mountain Guides in Greece.pdf | C:\........ |
| Guides | Level 1 | | | | All guides in Greece.pdf | C:\........ |
| Customers | Level 1 | | entity | | | |
| Correspondence | Level 1 | | | | | |
| Smith | Level 1 | | Instance | Customers | | |
| Beach | Level 1 | | | | Vistas.doc | C:\........ |
| Jones | Level 1 | | Instance | Customers | | |
| Brown | Level 1 | | Instance | Customers | Brown Details.doc | C:\........ |
| Eiger | Level 1 | | | | | |

| Name | Level | Preceding Topic | Type | Parent | Resources | Location |
|---|---|---|---|---|---|---|
| Smith | Level 2 | Customers | Instance | Customers | | |
| Jones | Level 2 | Customers | Instance | Customers | | |
| Brown | Level 2 | Customers | Instance | Customers | | |
| Beach | Level 2 | Smith | | | | |
| Skiing | Level 2 | Smith | | | | |
| Brown | Level 2 | Beach | | | Brown Holiday 2009.doc | C:\......... |
| Beach | Level 2 | Brown | | | Brown Holiday 2009.doc | C:\......... |
| Jones | Level 2 | Beach | | | Jones Beach Holiday 2009.doc | C:\......... |
| Jones | Level 2 | Beach | | | Jones Holiday 2005.doc | C:\......... |
| Beach | Level 2 | Jones | | | Jones Holiday 2005.doc | C:\......... |
| Beach | Level 2 | Jones | | | Jones Beach Holiday 2009.doc | C:\......... |
| Skiing in France | Level 2 | Skiing | | | Skiing in Chamonix.pdf | C:\......... |
| Skiing in Switzerland | Level 2 | Skiing | | | Skiing in Davos.pdf | C:\......... |
| Eiger | Level 2 | Mountain | | | Abc123.jpeg | C:\......... |
| Mountain | Level 2 | Eiger | | | Abc123.jpeg | C:\......... |
| Customers | Level 2 | Correspondence | Entity | | Bland.doc | C:\......... |
| Smith | Level 3 | Customers; correspondence | Instance | Customers | Letter to Mr Smith.doc | C:\......... |
| Brown | Level 3 | Customers; correspondence | Instance | Customers | Letter to Mr Brown.doc | C:\......... |
| Jones | Level 3 | Customers; correspondence | Instance | Customers | Letter to Mr Jones.doc | C:\......... |

| Name | Level | Preceding | Type | Parent | Resources | Location |
|---|---|---|---|---|---|---|
| Skiing | Level 1 | | | | Smith skiing Holiday 2008.doc | C:\......... |
| Skiing | Level 1 | | | | Snow White Ski Routes*.pdf | C:\......... |
| Skiing | Level 1 | | | | Skiing brochure 2009.pdf | C:\......... |
| Accounts | Level 1 | | | | US Accounts.xls | C:\......... |
| Accounts | Level 1 | | | | Canada Accounts.xls | C:\......... |
| Accounts | Level 1 | | | | Europe Accounts.xls | C:\......... |
| Mountain | Level 1 | | | | Mountain Guides in France.pdf | C:\......... |
| Mountain | Level 1 | | | | Mountain Guides in Italy.pdf | C:\......... |
| Mountain | Level 1 | | | | Mountain Guides in Greece.pdf | C:\......... |
| Mountain | Level 1 | | | | Photo.jpeg | C:\......... |
| Guides | Level 1 | | | | Mountain Guides in France.pdf | C:\......... |
| Guides | Level 1 | | | | Mountain Guides in Italy.pdf | C:\......... |
| Guides | Level 1 | | | | Mountain Guides in Greece.pdf | C:\......... |
| Guides | Level 1 | | | | All guides in Greece.pdf | C:\......... |
| Customers | Level 1 | | entity | | | |
| Correspondence | Level 1 | | | | | |
| Smith | Level 1 | | Instance | Customers | | |
| Beach | Level 1 | | | | Vistas.doc | C:\......... |
| Jones | Level 1 | | Instance | Customers | | |
| Brown | Level 1 | | Instance | Customers | Brown Details.doc | C:\......... |
| Eiger | Level 1 | | | | | |

| Name | Level | Preceding Topic | Type | Parent | Resources | Location |
|---|---|---|---|---|---|---|
| Smith | Level 2 | Customers | Instance | Customers | | |
| Jones | Level 2 | Customers | Instance | Customers | | |
| Brown | Level 2 | Customers | Instance | Customers | | |
| Beach | Level 2 | Smith | | | | |
| Skiing | Level 2 | Smith | | | | |
| Brown | Level 2 | Beach | | | Brown Holiday 2009.doc | C:\........ |
| Beach | Level 2 | Brown | | | Brown Holiday 2009.doc | C:\........ |
| Jones | Level 2 | Beach | | | Jones Beach Holiday 2009.doc | C:\........ |
| Jones | Level 2 | Beach | | | Jones Holiday 2005.doc | C:\........ |
| Beach | Level 2 | Jones | | | Jones Holiday 2005.doc | C:\........ |
| Beach | Level 2 | Jones | | | Jones Beach Holiday 2009.doc | C:\........ |
| Skiing in France | Level 2 | Skiing | | | Skiing in Chamonix.pdf | C:\........ |
| Skiing in Switzerland | Level 2 | Skiing | | | Skiing in Davos.pdf | C:\........ |
| Eiger | Level 2 | Mountain | | | Abc123.jpeg | C:\........ |
| Mountain | Level 2 | Eiger | | | Abc123.jpeg | C:\........ |
| Customers | Level 2 | Correspondence | Entity | | Bland.doc | C:\........ |
| Smith | Level 3 | Customers; correspondence | Instance | Customers | Letter to Mr Smith.doc | C:\........ |
| Brown | Level 3 | Customers; correspondence | Instance | Customers | Letter to Mr Brown.doc | C:\........ |
| Jones | Level 3 | Customers; correspondence | Instance | Customers | Letter to Mr Jones.doc | C:\........ |

FIG. 37b

| Name | Level | Preceding | Type | Parent | Resources | Location |
|---|---|---|---|---|---|---|
| Advertisers | Level 1 | | Entity | | | |
| Agents | Level 1 | | Entity | | | |
| BestTravel | Level 1 | | | | | |
| BestTravel | Level 2 | Agents | Instance | Agents | | |
| Package | Level 1 | | Composite | | | |
| Flight | Level 1 | | | | | |
| Transfer | Level 1 | | | | | |
| Hotels | Level 1 | | | | | |
| Flight | Level 2 | Package | Member | Package | | |
| Transfer | Level 2 | Package | Member | Package | | |
| Hotel | Level 2 | Package | Member | Package | | |

FIG. 37c

| Name | Level | Preceding | Type | Parent | Resources | Location |
|---|---|---|---|---|---|---|
| Skiing | Level 1 | | | | Smith skiing Holiday 2008.doc | C:\... |
| Skiing | Level 1 | | | | Snow White Ski Routes*.pdf | C:\... |
| Skiing | Level 1 | | | | Skiing brochure 2009.pdf | C:\... |
| Accounts | Level 1 | | | | US Accounts.xls | C:\... |
| Accounts | Level 1 | | | | Canada Accounts.xls | C:\... |
| Accounts | Level 1 | | | | Europe Accounts.xls | C:\... |
| Mountain | Level 1 | | | | Mountain Guides in France.pdf | C:\... |
| Mountain | Level 1 | | | | Mountain Guides in Italy.pdf | C:\... |
| Mountain | Level 1 | | | | Mountain Guides in Greece.pdf | C:\... |
| Mountain | Level 1 | | | | Photo.jpeg | C:\... |
| Guides | Level 1 | | | | Mountain Guides in France.pdf | C:\... |
| Guides | Level 1 | | | | Mountain Guides in Italy.pdf | C:\... |
| Guides | Level 1 | | | | Mountain Guides in Greece.pdf | C:\... |
| Guides | Level 1 | | | | All guides in Greece.pdf | C:\... |
| Customers | Level 1 | | entity | | | |
| Map | Level 1 | | | | Chamonix map.pdf | C:\... |
| Smith | Level 1 | | Instance | Customers | | |
| Beach | Level 1 | | | | Vistas.doc | C:\... |
| Jones | Level 1 | | Instance | Customers | | |
| Brown | Level 1 | | Instance | Customers | Brown Details.Doc | C:\... |
| Eiger | Level 1 | | | | | |

| Name | Level | Preceding Topic | Type | Parent | Resources | Location |
|---|---|---|---|---|---|---|
| Smith | Level 2 | Customers | Instance | Customers | | |
| Jones | Level 2 | Customers | Instance | Customers | | |
| Brown | Level 2 | Customers | Instance | Customers | | |
| Beach | Level 2 | Smith | | | | |
| Skiing | Level 2 | Smith | | | | |
| Brown | Level 2 | Beach | | | Brown Holiday 2009.doc | C:\......... |
| Beach | Level 2 | Brown | | | Brown Holiday 2009.doc | C:\......... |
| Jones | Level 2 | Beach | | | Jones Beach Holiday | C:\......... |
| Jones | Level 2 | Beach | | | Jones Holiday 2005.doc | C:\......... |
| Beach | Level 2 | Jones | | | Jones Holiday 2005.doc | C:\......... |
| Beach | Level 2 | Jones | | | Jones Beach Holiday | C:\......... |
| Skiing in France | Level 2 | Skiing | | | Skiing in Chamonix.pdf | C:\......... |
| Skiing in Switzerland | Level 2 | Skiing | | | Skiing in Davos.pdf | C:\......... |
| Eiger | Level 2 | Mountain | | | Abc123.jpeg | C:\......... |
| Mountain | Level 2 | Eiger | | | Abc123.jpeg | C:\......... |
| Customers | Level 2 | Correspondence | Entity | | Bland.doc | C:\......... |
| Smith | Level 3 | Customers; correspondence | Instance | Customers | Letter to Mr Smith.doc | C:\......... |
| Brown | Level 3 | Customers; correspondence | Instance | Customers | Letter to Mr Brown.doc | C:\......... |
| Jones | Level 3 | Customers; correspondence | Instance | Customers | Letter to Mr Jones.doc | C:\......... |

FIG. 41b

| Name | Synonym of | Level | Preceding Topic | Type | Parent | Resources | Location |
|---|---|---|---|---|---|---|---|
| Advertisers | | Level 1 | | Entity | | | |
| Agents | | Level 1 | | Entity | | | |
| Best Travel | | Level 1 | | | | | |
| Best Travel | | Level 2 | Agents | Instance | Agents | | |
| Package | | Level 1 | | Composite | | | |
| Flight | | Level 1 | | | | | |
| Transfer | | Level 1 | | | | | |
| Hotels | | Level 1 | | | | | |
| Flight | | Level 2 | Package | Member | Package | | |
| Transfer | | Level 2 | Package | Member | Package | | |
| Hotel | | Level 2 | Package | Member | Package | | |
| Chamonix | | Level 1 | | | | Chamonix map.doc | C:\... |
| Cham | Chamonix | Level 1 | | | | Chamonix map.doc | C:\... |

FIG. 41c

| Resources | Name | Level | Preceding Topic | Location |
|---|---|---|---|---|
| Smith skiing Holiday 2008.doc | Skiing | Level 1 | | C:\............ |
| Snow White Ski Routes*.pdf | Skiing | Level 1 | | C:\............ |
| Skiing brochure 2009.pdf | Skiing | Level 1 | | C:\............ |
| US Accounts.xls | Accounts | Level 1 | | C:\............ |
| Canada Accounts.xls | Accounts | Level 1 | | C:\............ |
| Europe Accounts.xls | Accounts | Level 1 | | C:\............ |
| Mountain Guides in France.pdf | Mountain | Level 1 | | C:\............ |
| Mountain Guides in Italy.pdf | Mountain | Level 1 | | C:\............ |
| Mountain Guides in Greece.pdf | Mountain | Level 1 | | C:\............ |
| Photo.jpeg | Mountain | Level 1 | | C:\............ |
| Mountain Guides in France.pdf | Guides | Level 1 | | C:\............ |
| Mountain Guides in Italy.pdf | Guides | Level 1 | | C:\............ |
| Mountain Guides in Greece.pdf | Guides | Level 1 | | C:\............ |
| All guides in Greece.pdf | Guides | Level 1 | | C:\............ |
| Chamonix map.pdf | Map | Level 1 | | C:\............ |
| Vistas.doc | Beach | Level 1 | | C:\............ |
| Brown Details.Doc | Brown | Level 1 | | C:\............ |
| Chamonix map.doc | Chamonix | Level 1 | | C:\............ |
| Chamonix map.doc | Cham | Level 1 | | C:\............ |

FIG. 42

| Resources | Name | Level | Preceding Topic | Location |
|---|---|---|---|---|
| Brown Holiday 2009.doc | Brown | Level 2 | Beach | C:\............ |
| Brown Holiday 2009.doc | Beach | Level 2 | Brown | C:\............ |
| Jones Beach Holiday | Jones | Level 2 | Beach | C:\............ |
| Jones Holiday 2005.doc | Beach | Level 2 | Jones | C:\............ |
| Jones Holiday 2005.doc | Jones | Level 2 | Beach | C:\............ |
| Jones Beach Holiday | Beach | Level 2 | Jones | C:\............ |
| Skiing in Chamonix.pdf | Skiing in France | Level 2 | Skiing | C:\............ |
| Skiing in Davos.pdf | Skiing in Switzerland | Level 2 | Skiing | C:\............ |
| Abc123.jpeg | Eiger | Level 2 | Mountain | C:\............ |
| Abc123.jpeg | Mountain | Level 2 | Eiger | C:\............ |
| Bland.doc | Customers | Level 2 | Correspondence | C:\............ |
| Letter to Mr Smith.doc | Smith | Level 3 | Customers; correspondence | C:\............ |
| Letter to Mr Brown.doc | Brown | Level 3 | Customers; correspondence | C:\............ |
| Letter to Mr Jones.doc | Jones | Level 3 | Customers; correspondence | C:\............ |

FIG. 43

| Partial Topic Table for User A | Level | Preceding Topic | Type | Parent | Resources | Share |
|---|---|---|---|---|---|---|
| Brown | 1 | none | | | Brown Booking 2009.doc | Agency Team One |
| Jones | 1 | none | | | Jones Booking 2009.doc | Agency Team One |
| Eiger | 1 | none | | | Brown Booking 2009.doc | Agency Team One |
| delMare | 1 | none | | | Jones Booking 2009.doc | Agency Team One |
| Dawson | 1 | none | | | Dawson Flight 2009.doc | Agency Team One |
| FlyUK | 1 | Airlines | | | Dawson Flight 2009.doc | Agency Team One |

FIG. 49

| Partial Topic Table for User A | Level | Preceding Topic | Type | Parent | Resources | Share |
|---|---|---|---|---|---|---|
| Brown | 1 | none | | | Letter to Mr Brown.doc | User A |
| Brown | 1 | none | | | Brown Booking 2009.doc | Agency Team One |
| Brown | 1 | none | | | Brown Holiday 2009.doc | User A |
| Jones | 1 | none | | | Letter to Mr Jones.doc | User A |
| Jones | 1 | none | | | Jones Beach Holiday | User A |
| Eiger | 1 | none | | | Brown Booking 2009.doc | Agency Team One |
| delMare | 1 | none | | | Jones Booking 2009.doc | Agency Team One |
| Dawson | 1 | None | | | Dawson Flight 2009.doc | Agency Team One |
| FlyUK | 1 | Airlines | | | Dawson Flight 2009.doc | Agency Team One |
| Customers | 1 | none | Entity | | | User A |
| Smith | 2 | Customers | Instance | Customers | | User A |
| Jones | 2 | Customers | Instance | Customers | | User A |
| Brown | 2 | Customers | Instance | Customers | | User A |

FIG. 50

| Partial Topic | Level | Preceding | Type | Parent | Resources | Share |
|---|---|---|---|---|---|---|
| Brown | 1 | none | | | Letter to Mr Brown.doc | Agency Team One |
| Brown | 1 | none | | | Brown Booking | Agency Team One |
| Brown | 1 | none | | | Brown Holiday 2009.doc | User A |
| Jones | 1 | none | | | Letter to Mr Jones.doc | User A |
| Jones | 1 | none | | | Jones Beach Holiday | User A |
| Eiger | 1 | none | | | Brown Booking | Agency Team One |
| delMare | 1 | none | | | Jones Booking | Agency Team One |
| Dawson | 1 | None | | | Dawson Flight 2009.doc | Agency Team One |
| FlyUK | 1 | Airlines | | | Dawson Flight 2009.doc | Agency Team One |
| Customers | 1 | none | Entity | | | Agency Team One |
| Smith | 2 | Customers | Instance | Customers | | Agency Team One |
| Jones | 2 | Customers | Instance | Customers | | Agency Team One |
| Brown | 2 | Customers | Instance | Customers | | Agency Team One |

FIG. 51

| Partial Topic | Level | Preceding | Type | Parent | Resources | Share |
|---|---|---|---|---|---|---|
| Brown | 1 | none | | | Letter to Mr Brown.doc | Agency Team One |
| Jones | 1 | none | | | | Agency Team One |
| Eiger | 1 | none | | | | Agency Team One |
| Customers | 2 | Eiger | Entity | | | Agency Team One |
| delMare | 1 | none | | | | Agency Team One |
| Customers | 2 | Eiger | Entity | | | Agency Team One |
| Dawson | 1 | none | | | Dawson flight 2009.doc | Agency Team One |
| FlyUK | 1 | Airlines | | | Dawson flight 2009.doc | Agency Team One |
| Customers | 1 | none | Entity | | | Agency Team One |
| Smith | 2 | Customers | Instance | Customers | | Agency Team One |
| Jones | 2 | Customers | Instance | Customers | Jones Booking 2009.doc | Agency Team One |
| Brown | 2 | Customers | Instance | Customers | Brown Booking 2009.doc | Agency Team One |

FIG. 52

| Name | Level | Preceding | Type | Parent | Resources | Share |
|---|---|---|---|---|---|---|
| Customers | Level 1 | none | entity | | | Agency Team 2 |
| Brown | Level 1 | none | Instance | Customers | | Agency Team 2 |
| Jones | Level 1 | none | Instance | Customers | | Agency Team 2 |
| Smith | Level 1 | none | Instance | Customers | | Agency Team 2 |
| Smith | Level 2 | Parent | Instance | Customers | Letter to Mr Smith.doc | Agency Team 2 |
| Brown | Level 2 | Parent | Instance | Customers | Brown Holiday 2009.doc | Agency Team 2 |
| Brown | Level 2 | Parent | Instance | Customers | Letter to Mr Brown.doc | Agency Team 2 |
| Jones | Level 2 | Parent | Instance | Customers | Jones Beach Holiday 2009.doc | Agency Team 2 |
| Jones | Level 2 | Parent | Instance | Customers | Letter to Mr Jones.doc | Agency Team 2 |
| Beach | Level 1 | none | | | | Agency Team 2 |
| Beach | Level 2 | Smith | | | | Agency Team 2 |
| Skiing | Level 2 | Smith | | | | Agency Team 2 |
| Beach | Level 2 | Brown | | | Brown Holiday 2009.doc | Agency Team 2 |
| Beach | Level 2 | Jones | | | Jones Beach Holiday 2009.doc | Agency Team 2 |

FIG. 53

| Name | Level | Preceding Topic | Type | Parent | Resources | Share |
|---|---|---|---|---|---|---|
| Hotels | Level 1 | None | entity | | | Agency Team 2 |
| Eiger | Level 2 | none | Instance | Hotels | | Agency Team 2 |
| delMare | Level 2 | none | Instance | Hotels | | Agency Team 2 |
| deVille | Level 2 | none | Instance | Hotels | | Agency Team 2 |
| Eiger | Level 2 | Parent | Instance | Hotels | Eiger Pricelist.xls | Agency Team 2 |
| delMare | Level 2 | Parent | Instance | Hotels | delMare Pricelist.xls | Agency Team 2 |
| deVille | Level 2 | Parent | Instance | Hotels | deVille Pricelist.xls | Agency Team 2 |

FIG. 54

| Name | Level | Preceding Topic | Type | Parent | Resources | Team Topic |
|---|---|---|---|---|---|---|
| Airlines | Level 1 | None | entity | | | Agency Team 2 |
| FlyUk | Level 1 | none | Instance | Airlines | | Agency Team 2 |
| FlyFrance | Level 1 | none | Instance | Airlines | | Agency Team 2 |
| FlySwiss | Level 1 | none | Instance | Airlines | | Agency Team 2 |
| FlyUK | Level 2 | Parent | Instance | Airlines | Timetable 2008.xls | Agency Team 2 |
| FlyUK | Level 2 | Parent | Instance | Airlines | Timetable 2009.xls | Agency Team 2 |
| FlyUK | Level 2 | Parent | Instance | Airlines | Dawson flight.doc | Agency Team 2 |
| FlyFrance | Level 2 | Parent | Instance | Airlines | Timetable 2008.xls | Agency Team 2 |
| FlyFrance | Level 2 | Parent | Instance | Airlines | Timetable 2009.xls | Agency Team 2 |
| FlyFrance | Level 2 | Parent | Instance | Airlines | Smith Flight.docs | Agency Team 2 |
| FlySwiss | Level 2 | Parent | Instance | Airlines | Timetable 2008.xls | Agency Team 2 |
| FlySwiss | Level 2 | Parent | Instance | Airlines | Timetable 2009.xls | Agency Team 2 |
| FlySwiss | Level 2 | Parent | Instance | Airlines | Jones Flight.doc | Agency Team 2 |

FIG. 55

| Name | Level | Preceding | Type | Parent | Resources | Team Topic |
|---|---|---|---|---|---|---|
| Partners | Level 1 | none | entity | | | Agency Team 2 |
| BeSafe Insurance | Level 1 | none | Instance | Partners | | Agency Team 2 |
| Andare Coaches | Level 1 | none | Instance | Partners | | Agency Team 2 |
| Snow White Ski Guides | Level 1 | none | Instance | Partners | | Agency Team 2 |
| BeSafe Insurance | Level 2 | Parent | Instance | Partners | BeSafe Insurance.pdf | Agency Team 2 |
| Andare Coaches | Level 2 | Parent | Instance | Partners | Andare Timetable.pdf | Agency Team 2 |
| Snow White Ski | Level 2 | Parent | Instance | Partners | Snow White Ski.pdf | Agency Team 2 |

FIG. 56

| Name | Level | Preceding | Type | Parent | Resources | Share |
|---|---|---|---|---|---|---|
| Customers | Level 1 | none | entity | | Bland.doc | Agency Team 2 |
| Smith | Level 2 | Parent | Instance | Customers | Letter to Mr Smith.doc | Agency Team 2 |
| Brown | Level 2 | Parent | Instance | Customers | Brown Holiday 2009.doc | Agency Team 2 |
| Brown | Level 2 | Parent | Instance | Customers | Letter to Mr Brown.doc | Agency Team 2 |
| Jones | Level 2 | Parent | Instance | Customers | Jones Beach Holiday 2009.doc | Agency Team 2 |
| Jones | Level 2 | Parent | Instance | Customers | Letter to Mr Jones.doc | Agency Team 2 |
| Beach | Level 1 | none | | | | Agency Team 2 |
| Beach | Level 2 | Smith | | | | Agency Team 2 |
| Skiing | Level 2 | Smith | | | | Agency Team 2 |
| Beach | Level 2 | Brown | | | Brown Holiday 2009.doc | Agency Team 2 |
| Beach | Level 2 | Jones | | | Jones Beach Holiday 2009.doc | Agency Team 2 |
| Hotels | Level 1 | none | entity | | | Agency Team 2 |
| Eiger | Level 2 | Parent | Instance | Hotels | Eiger Pricelist 2009.xls | Agency Team 2 |
| delMare | Level 2 | Parent | Instance | Hotels | delMare Pricelist 2009.xls | Agency Team 2 |
| deVille | Level 2 | Parent | Instance | Hotels | deVille Pricelist 2009.xls | Agency Team 2 |

FIG. 57a

| Name | Level | Preceding | Type | Parent | Resources | Share |
|---|---|---|---|---|---|---|
| Airlines | Level 1 | | entity | | | Agency Team 2 |
| FlyUK | Level 2 | Parent | Instance | Airlines | Timetable 2008.xls | Agency Team 2 |
| FlyUK | Level 2 | Parent | Instance | Airlines | Timetable 2009.xls | Agency Team 2 |
| FlyUK | Level 2 | Parent | Instance | Airlines | Dawson flight.doc | Agency Team 2 |
| FlyFrance | Level 2 | Parent | Instance | Airlines | Timetable 2008.xls | Agency Team 2 |
| FlyFrance | Level 2 | Parent | Instance | Airlines | Timetable 2009.xls | Agency Team 2 |
| FlyFrance | Level 2 | Parent | Instance | Airlines | Smith Flight.docs | Agency Team 2 |
| FlySwiss | Level 2 | Parent | Instance | Airlines | Timetable 2008.xls | Agency Team 2 |
| FlySwiss | Level 2 | Parent | Instance | Airlines | Timetable 2009.xls | Agency Team 2 |
| FlySwiss | Level 2 | Parent | Instance | Airlines | Jones Flight.doc | Agency Team 2 |
| Partners | Level 1 | none | entity | | | Agency Team 2 |
| BeSafe Insurance | Level 2 | Parent | Instance | Partners | BeSafe Insurance .pdf | Agency Team 2 |
| Andare Coaches | Level 2 | Parent | Instance | Partners | Andare Timetable.pdf | Agency Team 2 |
| Snow White Ski Guides | Level 2 | Parent | Instance | Partners | Snow White Ski.pdf | Agency Team 2 |

FIG. 57b

| Name | Level | Preceding | Type | Parent | Resources | Share |
|---|---|---|---|---|---|---|
| Customers | Level 2 | FlyFrance | Entity | Airlines | Smith Flight.doc | Agency Team 2 |
| Customers | Level 2 | FlySwiss | Entity | Airlines | Jones Flight.doc | Agency Team 2 |
| Smith | Level 3 | Customers; | Instance | Airlines | Smith Flight.doc | Agency Team 2 |
| Jones | Level 3 | Customers; | Instance | Airlines | Jones Flight.doc | Agency Team 2 |

| Topic List | Topic Browser | Resources |
|---|---|---|
| Airlines<br>⛬ Andare Coaches<br>Beach<br>BeSafe Insurance<br>Brown<br>⛬ Customers<br>delMare<br>deVille<br>Eiger<br>FlyUK<br>FlyFrance<br>FlySwiss<br>Hotels<br>Jones<br>⛬ Partners<br>Smith<br>Snow White Ski Guides<br>Skiing | Customers ◂<br><br>├── • Smith<br>├── • Brown<br>└── • Jones | |

FIG. 59

| Topic List | Topic Browser | Resources |
|---|---|---|
| Accounts<br>Beach<br>Brown<br>Chamonix<br>Correspondence<br>Customers<br>Davos<br>Jones<br>Mountain<br>Saas Fee<br>Ski Resorts<br>Skiing<br>Skiing in France<br>Skiing in Switzerland<br>Smith<br>Zermatt | Skiing in Switzerland<br>  └─Ski Resorts ◄<br>      └─Saas Fe | Events 2009.doc |

Email from Mr Green

Subject: SAAS FEE

Saas Fee Events... Saas Fee has a huge amount of exiciting events this year...
The Saas Fee Barber Shop singers....

⇨

Topic: Activities

Resources:
Email; Subject SAAS FEE

FIG. 69

Email attachment; letter 2.doc

Reference: ABC1234567

Snow white leads you on some of the best skiing in Europe....
Our skiing experience is second to none....
Our prices for skiing this year....

⇨

Topic: Mountain

Resources:
Letter2.doc

FIG. 70

Whiteout there.doc

Snow White Ski Brochure

Snow white is ski (SWIS) guides (SWSG) will lead you on some of the best free range mountain skiing available in Europe this year Our skiing experience is second to none and with cheap flights on FlyFrance and FlyFrance Our package prices for skiing this year provide unbeatable value.

Special offer this month for a family party in the idylic resort of Zermat at the Eiger Hotel.....

Alternatively, for the expert skier, we have a special deal at Saas Fee....

| Contents | Topic Browser | References |
|---|---|---|
| Eiger Hotel<br>Hotels<br>Mountain<br>Saas Fee<br>Ski Resorts<br>Skiing<br>Snow White Ski Guides | Skiing | P 1, 2, 7 |

FIG. 71

ACCESSING STORED ELECTRONIC RESOURCES

FIELD

The present invention relates to providing access to stored electronic resources such as word documents, PDF documents, emails, digital photographs.

BACKGROUND

One well known approach to providing access to stored electronic resources is to use a "file manager" approach in which user-defined named physical storage sets or areas, sometimes referred to as "folders", are used to store and provide access to electronic resources. An example of a simple folder arrangement is folders named with client names within which further folders named with case names or identifiers are stored. Electronic resources such as word documents and emails for a particular case for a particular client are stored in the appropriate folder. Disadvantages of the file manager approach include: the user needs to exercise good discipline to set-up and maintain the structure which in reality is rarely, if ever, exercised; sometimes a single resource may relate to two or more subjects and therefore there is uncertainty where to store the resource. Furthermore, in some instances an electronic resource may not fit into a particular folder structure, and often users have "general" or "miscellaneous" folders for this kind of item which overtime can become very large. Consequently, there is delay and frustration when later trying to locate and access resources, with the user possibly having to resort to multiple searches for misplaced or "lost" electronic resources. Overall, with the routine use of computers both for leisure and business and the high numbers of electronic resources, not least emails, which users need to process, store and later access, there are significant inefficiencies of using a file manager approach particularly when electronic resources become misplaced or "lost".

The present invention is made with the above considerations in mind and seeks to provide an improved way of providing access to stored electronic resources.

SUMMARY

According to an aspect of the present invention, there is provided a method for configuring a computer system to provide access to stored electronic resources as defined in claim 1.

Another aspect of the present invention provides a system comprising a memory and a processor, wherein the processor is arranged to perform the above method.

Another aspect of the present invention provides a computer-readable medium having computer-executable instructions adapted to cause a computer system to perform the above method.

By providing a topic framework with topic names derived from the names of the named storage sets and the names or content of the electronic resources, and by deriving the associations between the electronic resources and the topic names, an improved approach to accessing the electronic resources is provided. For example: the user does not need to set up the topic structure; new topics (the ones derived from the resource names or content) can be identified without the user having to identify and define them; electronic resources can be associated with more than one topic without multiple copies of the resource being stored; electronic resources can be located and accessed through multiple entry points, that is, through multiple topic names. Accordingly, it can be seen that such a topic framework provides a versatile tool for locating and accessing stored electronic resources.

Other aspects and features of the present invention will be appreciated from the following description and the accompanying claims.

BRIEF DESCRIPTION OF THE DRAWINGS

Embodiments of the present invention will now be described, by way of example only, with reference to the accompanying drawings in which like reference numerals are used to depict like parts. In the drawings:

FIGS. 5 and 6 show a table used to store topic names and associations.

FIG. 10 shows a table.

FIG. 11 shows an interface.

FIG. 15 shows a table.

FIG. 16 shows an interface.

FIGS. 23(*a*) and 23(*b*) show a table.

FIGS. 24 to 27 show an interface.

FIGS. 29(*a*) and 29(*b*) show a table.

FIGS. 33(*a*) and 33(*b*) show a table

FIGS. 37(*a*), 37(*b*) and 37(*c*) show a table.

FIGS. 41(*a*), 41(*b*) and 41(*c*) show a table.

FIGS. 42-44 illustrate normalising tables.

FIGS. 49-59 illustrate a team topic framework.

FIGS. 69 and 70 illustrate associating resources based on rules.

FIG. 71 illustrates identifying relevant information in a resource using the topic framework.

DETAILED DESCRIPTION

Figure 1:
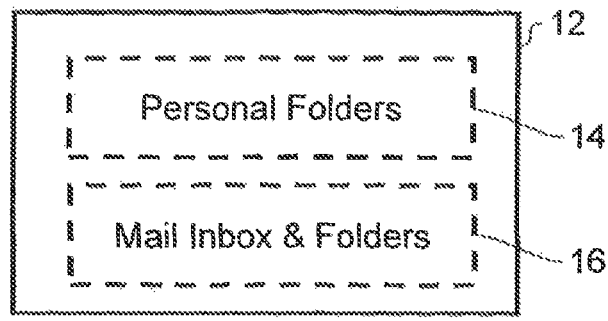
FIG. 1 illustrates a computer having named storage sets.

FIG. 1 illustrates a memory 12 of a computer system which can comprise named storage sets or folders 14 such as a folder structure in which electronic resources such as Word documents, pdf documents, PowerPoint presentations, photographs and other computer files are stored. Some other electronic resources such as emails may be stored outside the named storage sets 14 in another user area 16 such an email application, for example Microsoft Outlook. The sets 14 may be named physical storage sets/folders in which at least some of the electronic resources are physically stored. Alternatively or additionally, they may be virtual sets or collections of resources. In the detailed description, for simplicity examples will be described which use sets of resources in the form of folders.

Figure 2:
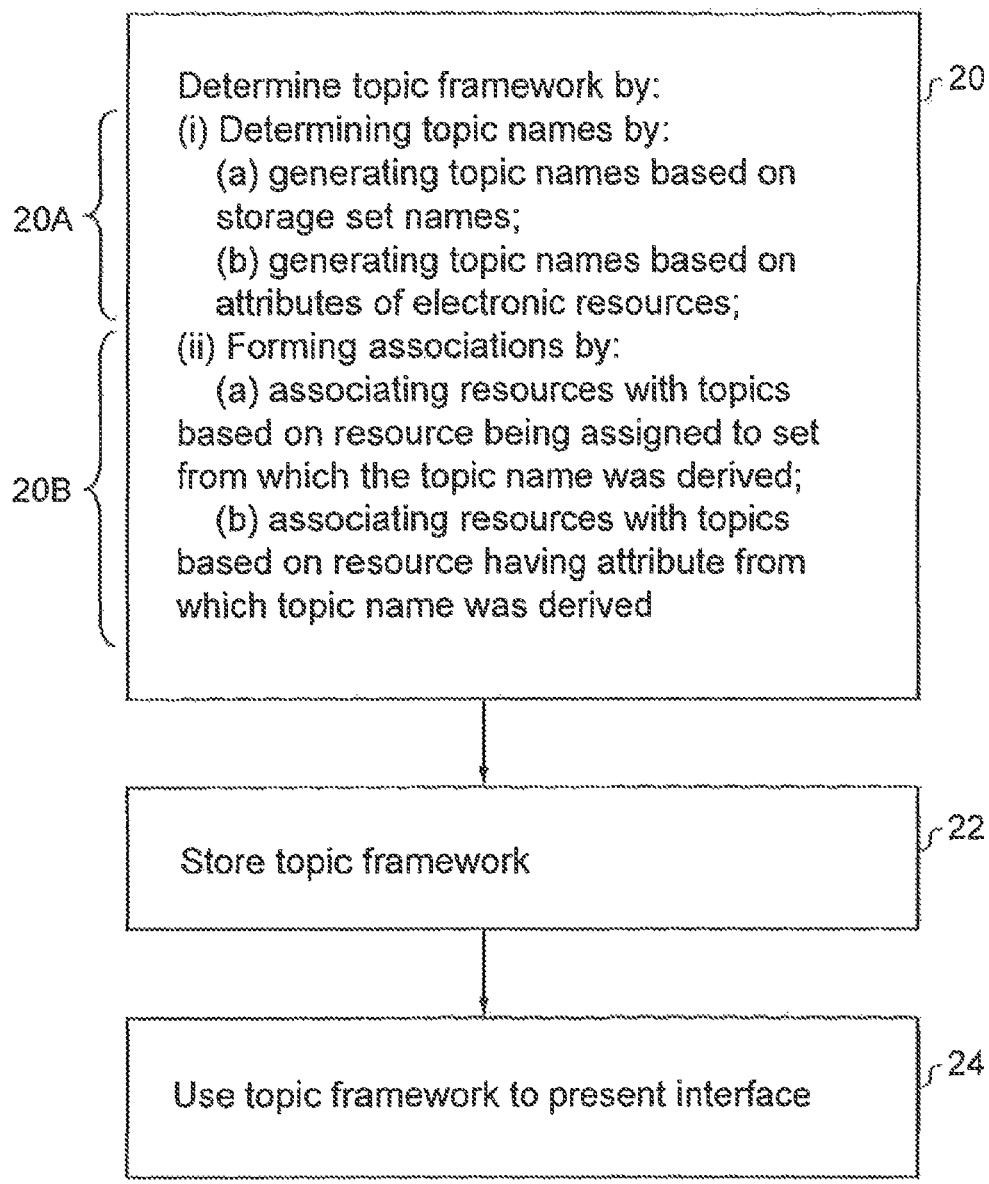
FIG. 2 is a flow diagram.

FIG. 2 is a flow diagram which shows the steps of a method in accordance with an embodiment of the invention. With reference to FIG. 2, a method is illustrated for configuring a computer system to provide access to stored electronic resources, at least some of which are assigned to named storage sets. At step 20, a topic framework is determined. The topic framework comprises topic names and associations between each of the stored electronic resources and one or more topic names. As shown in steps 20A and 20B, the topic framework is determined by: (i) (step 20A) determining the topic names for the topic framework by: (a) generating one or more topic names based on the names assigned to storage sets; and (b) generating one or more topic names based on attributes of individual electronic resources; and (ii) (step 20B) forming the associations between each of the stored electronic resources and one or more topic names by: (a) associating electronic resources assigned to a storage set with one or more topic names which were generated based on the name of the storage set; and (b) associating electronic resources having an attribute or attributes with one or more topic names which were generated based on the respective attribute or attributes of the electronic resources.

Steps 20A and 20B may be performed as two separate stages; that is, the topics may first be generated before then generating the associations. For example, step 20A may be performed by processing all sets/folders once and by processing all electronic folders once; followed by step 20B being performed by processing all sets/folders a second time and by processing all electronic resources a second time, and on the second iteration checking the names of the sets and attributes against the topic names that were generated and stored in the first iteration. Alternatively or additionally, parts of steps 20A and 20B may be performed together; for example, a topic may be generated at substantially the same time as its associations are generated. For example, the sets/folders may be processed and once a topic name is generated from a set/folder and stored, the associations can be then be generated and stored before processing another set/folder. The electronic resources can then be processed, again storing the associations as the topic names are generated and stored.

Then at step 22, the topic framework is stored to provide a persistent structure through which the electronic resources can be accessed using the topic names. At step 24 the topic framework is then used to present on an interface a group of stored electronic resources associated with a respective one or more topic names so that one or more of the group of electronic resources can be selected for access.

The steps shown in the flow diagram of FIG. 2 in various embodiments of the present invention will be described in detail throughout this detailed description with reference to the accompanying drawings. Throughout the description "electronic resource" and "resource" are used interchangeably as are "topic name" and "topic", unless context dictates otherwise.

Figure 3:
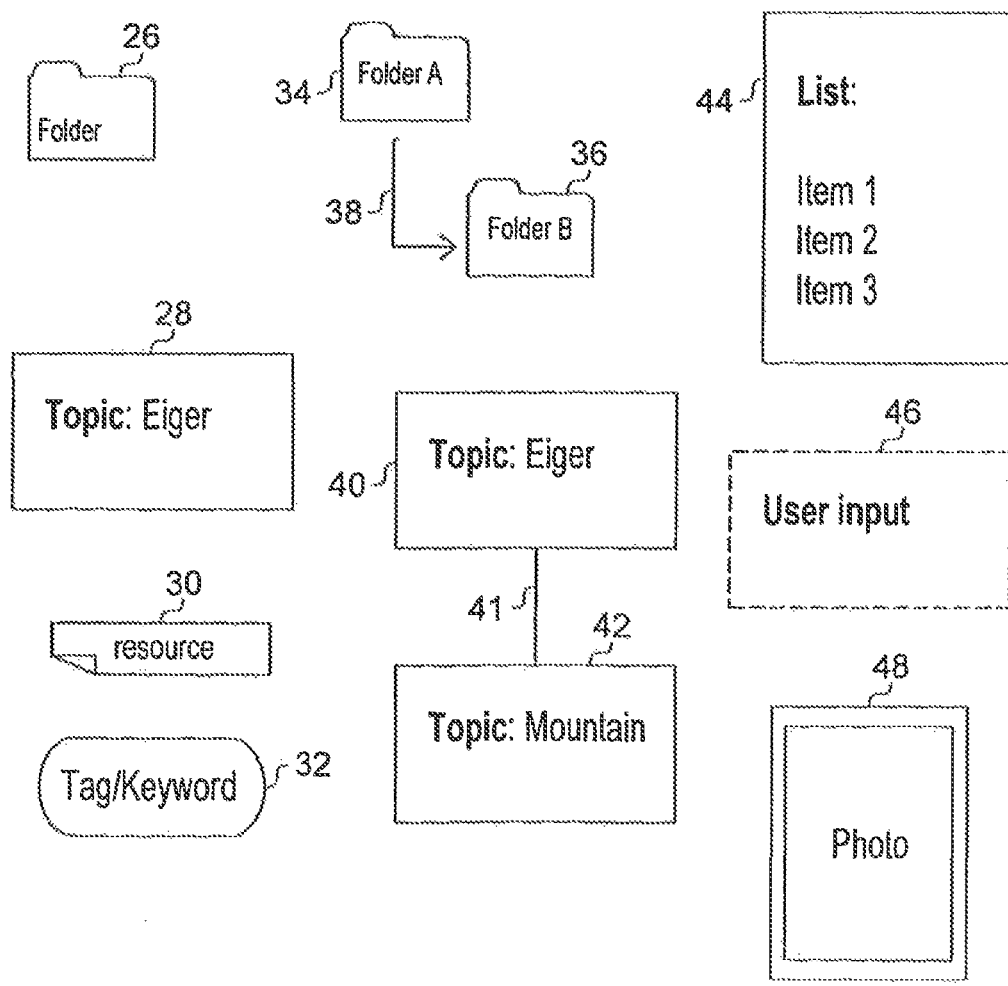
FIG. 3 is a key.

FIG. 3 is a key for understanding the pictorial elements used in the accompanying drawings. With reference to FIG. 3, pictorial elements as examples of a Folder 26, Topic 28, Resource 30 and an attribute 32 in the form of a Tag or Keyword are shown. Also shown in the figure are a hierarchical relationship between Folder A 34 and Folder B 36 using arrow 38. Here, Folder B is lower in the hierarchy than Folder A; that is, Folder B is "in" Folder A. Also shown pictorially in the figure is an association 41 between a first topic 40 and a second topic 42. Here the two topics are "Eiger" and "Mountain". A list 44, user input 46 and a photograph file or electronic resource 48 are also shown.

Figure 4A:
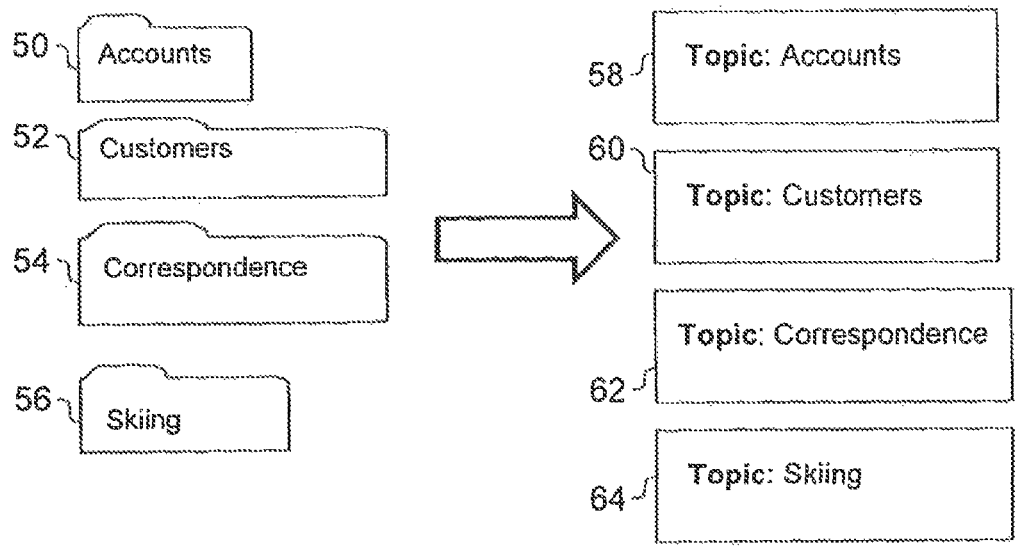
FIG. 4*a* shows folders and topics or topic names.

FIG. 4a schematically depicts an example of part (a) of Step 20A of FIG. 2; that is, it shows an example of generating one or more topic names based on the names assigned to storage sets. To do this each storage set or folder can be processed in turn and the name of the storage folder read and stored as topic names. With reference to FIG. 4a, there are four folders 50, 52, 54 and 56 which are named respectively as "Accounts", "Customers", "Correspondence" and "Skiing". Four corresponding topic names 58, 60, 62 and 64 which of "Accounts", "Customers", "Correspondence" and "Skiing", respectively, are generated and stored.

FIGS. 5 and 6 illustrate examples of a table 114 in which the topic names can be stored. For each storage set or folder an entry in the table 114 can be made. FIG. 5 illustrates a simple example of table 114. FIG. 6 is a more complex example.

In Step 20B, which will be described later, the names of the resources associated with a topic can be stored (in the Resources column) and the location of the resource is stored (in the Location column) for example as a physical storage path.

In more detailed or complex implementations, other columns in table 114 can be used to store further details about the topics, as shown in FIG. 6, and these details will be described further throughout this description. With reference to FIG. 6, where topics can be associated with other topics the level (in the Level column) of the topic in a hierarchy can be stored in table 114. If the topic is at an upper or root level, then the level can be stored as Level 1. If it is at the next level (i.e. as a first generation "child" topic) then the level would be Level 2 and so on. The name of the topic of a preceding topic in such a hierarchy can be stored in the Preceding Topic column. A type for the topic (such as entity or instance, which will be described later) can also be stored in the table in the Type column. The name of a parent topic can be stored in the Parent column, which can be used for entities and instances as will be described later.

Figure 4B:
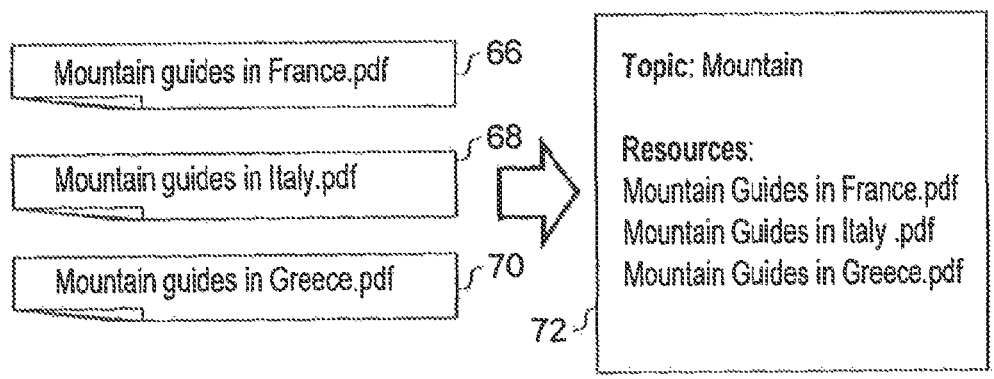
FIG. 4*b* shows electronic resources and topics.
Figure 4C:
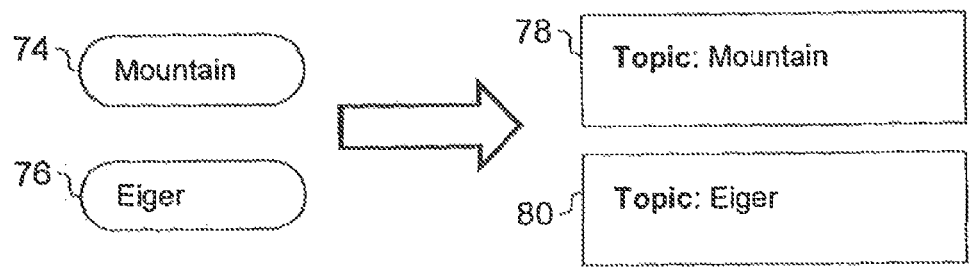
FIG. 4*e* shows keywords or tags and topics.

FIGS. 4b and 4c schematically depict examples of part (b) of Step 20A of FIG. 2; that is, these two figures show examples of generating one or more topic names based on attributes of individual electronic resources. To do this each electronic resource can be processed in turn and its attribute or attributes read and stored as a topic name(s). The attributes of individual electronic resources may be any attribute of property which is associated with an individual electronic resource. For example, the attribute of individual electronic resource may be the name or other identifier for the electronic resource, a keyword or tag associated with the electronic resources or a part of the content of the electronic resource such as an unusual word or a word used frequently in the text of the electronic resource. The topic name derived from an attribute can be stored in table 114 of FIG. 5 or 6.

With reference to FIG. 4b, three electronic resources 66, 68 and 70 respectively named "Mountain guides in France", "Mountain guides in Italy" and "Mountain guides in Greece" are shown. Based on searching through the attributes of these resources (here the attribute is the name of the resources) and identifying that a word (here the word "Mountain") appears frequently in the name of a small number of resources, the word is identified as a topic. That is, a topic 72 called "Mountain" is generated. Words nearer the beginning of resource names in particular embodiments of the invention may be given preference meaning that in this example "Mountain" is generated as a topic name but not "Guides". The topic name can be stored in table 114.

With reference to FIG. 4c, if keywords or tags are associated with an electronic resource such as the keywords or tags "Mountain" 74 and "Eiger" 76 for a photograph file, the topics Mountain 78 and Eiger 80 are generated. The topic name can be stored in table 114.

Figure 7:
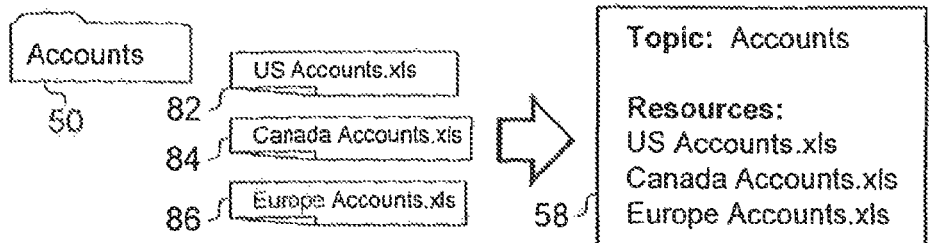
FIG. 7 shows a folder, electronic resources and a topic

FIG. 7 schematically depicts an example of part (a) of Step 20B of FIG. 2; that is, the figure shows an example of associating electronic resources assigned to a storage set or folder with one or more topic names which were generated based on the name of the storage set/folder. In this example, three electronic resources 82, 84 and 86, named respectively "US Accounts", "Canada Accounts" and "Europe Accounts" are stored in Accounts folder 50. As illustrated earlier with reference to FIG. 4a "Accounts" has been generated and stored as a topic name. The folder can be processed by reading its name, checking to see if at least part of the name is a topic name and, if so, making associations between the resources in the folder and the topic name. Accordingly, the electronic resources which were stored in the corresponding folder 50 from which the accounts topic name 58 was generated are associated with the topic name. That is, electronic resources 82, 84 and 86 are associated with the "Accounts" topic 58. Or, in other words, an association is formed between each of these electronic resources and the topic name. The association can be stored in table 114 by storing the resource name and its location next to the topic name. An entry or line in the table can be made for each resource.

Referring back to FIG. 4b, this figure shows schematically an example of part (b) of Step 20B of FIG. 2; that is, it shows an example of associating electronic resources having an attribute or attributes, with one or more topic names which were generated based on the respective attribute or attributes of the electronic resources. The topic name "Mountain" has already been generated and stored. Each resource can be processed by reading its attribute(s), checking to see at least part of the attribute is a topic name and, if so, making associations between that resource and that topic name. Accordingly, as can be seen from the figure, resources 66, 68 and 70 can be associated with the topic name ("Mountain") 72 which was generated based on an attribute (here, the name) of each of the electronic resources. In other words, an association is formed between each of these electronic resources and the topic name. The association can be stored in table 114 by storing the resource name and its location next to the topic name. An entry or line in the table can be made for each resource.

Figure 8:
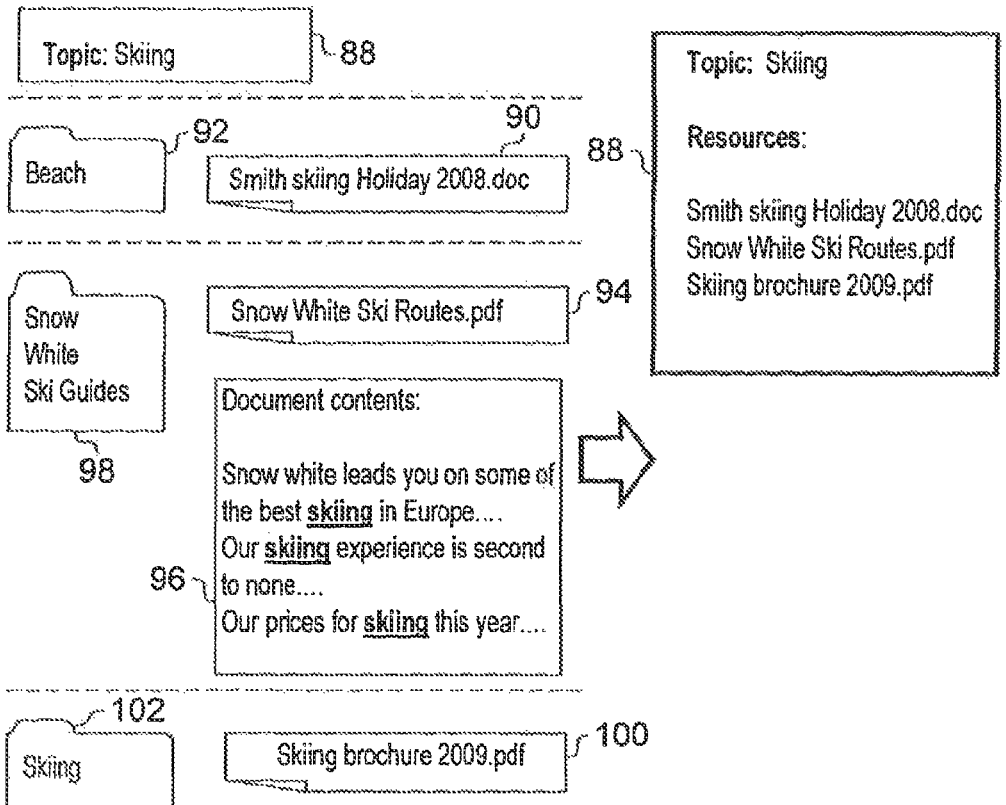
FIG. 8 shows three folders and a topic.

FIG. 8 also shows schematically an example of part (b) of Step 20B of FIG. 2. In this example the topic "Skiing" 88 is used. As shown in the figure, an electronic resource 90 called "Smith skiing Holiday 2008" is stored in "Beach" folder 92. An electronic resource "Snow White Ski Routes" 94 with the contents 96 in which the word "skiing" appears several times is in the "Snow White Ski Guides" folder 98. An electronic resource 100 called "Skiing Brochure 2009" is stored in folder 102. The topic name "Skiing" 88 has already been generated and stored (see the description with reference to FIG. 4a), but could also have been generated from the names of electronic resources 90 and 100 and the content of electronic resource 94. Each resource can be processed by reading its attribute(s), checking to see if at least part of the attribute is a topic name (here Skiing) and, if so, making associations between that resource and that topic name. Accordingly, each of these resources is associated with the topic name. That is to say, an association is formed between each of these electronic resources and the topic name. The association can be stored in table 114 by storing the resource name and its location next to the topic name. An entry or line in the table can be made for each resource.

Figure 9:
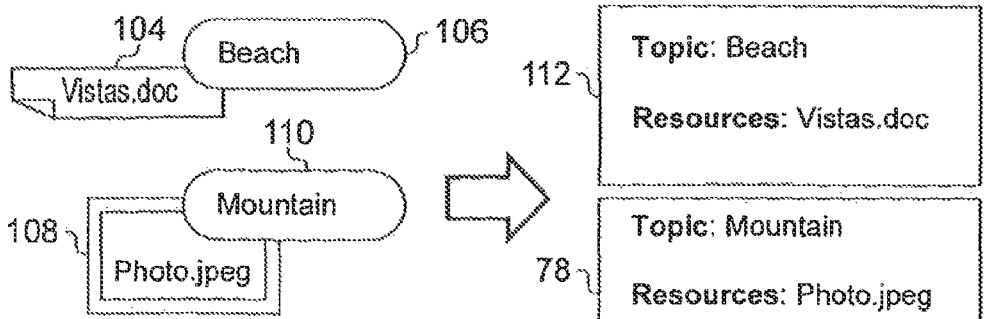
FIG. 9 shows two electronic resources with keywords or tags.

FIG. 9 also shows schematically an example of part (b) of Step 20B of FIG. 2. Here the attribute is a keyword or tag. An electronic resource 104 named "Vistas" has the keyword/tag "Beach" 106 associated with it. A photograph file "Photo" 108 has the keyword/tag "Mountain" 110 associated with it. Topic names "Beach" 112 and "Mountain" 78 may have already been generated and stored (see FIG. 4c for "Mountain"), but could also have been generated based on these keyword/tag attributes. Each resource can be processed by reading its attribute(s), checking to see if at least part of the attribute is a topic name and, if so, making associations between that resource and that topic name. Accordingly, the respective electronic resource is associated with the respective topic. That is, "Vistas" 104 is associated with the topic name "Beach" 112 and "Photo" 108 is associated with the topic name "Mountain" 78. In other words, an association is formed between each of these electronic resources and the respective topic name. The association can be stored in table 114 by storing the resource name and its location next to the topic name. An entry or line in the table can be made for each resource.

FIG. 10 shows an example of step 22 of FIG. 2; that is, the figure shows how the topic framework is stored. The topic names can be stored as a table where the topic name is listed in the same row as the name of an electronic resource which has an association with the topic. The physical location of each resource is also stored. FIG. 10 shows a particular example of a table 114. In the table 114 of FIG. 10 a topic level column is shown, as is a preceding topic column. Each of the examples in FIG. 10 are first or upper level topic names (that is, at this stage we are not dealing with a hierarchical topic structure). For this reason, each of the Levels is listed as "Level 1" and the "Preceding Topic" column is empty in the figure.

FIG. 11 shows an example of step 24 of FIG. 2; that is, the figure shows an example of how the topic framework is used to present on an interface 116 in resource part or window 118, a group of stored demonic resources associated with a respective one or more topic names 120 so that one or more of the group of electronic resources can be selected for access. The table 114 of FIG. 10 can be used to generate interface 116 and if one of the electronic resources 118 is selected the resource can be accessed using the location information stored in the table. Optionally, a topic browser 122 may be displayed as part of the interface 116, and its purpose will now be described.

With reference to FIGS. 10 and 11, although not depicted in those figures, it will be appreciated that where the same topic name is generated from the storage set names and from an attribute of an electronic resource, a "view" of the resources (i.e. the particular group of electronic resources displayed) can include resources that are associated by topic name but which are stored in different physical locations. That is, the topic framework can group resources together which were not grouped together in the original storage folder structure.

Figure 12:
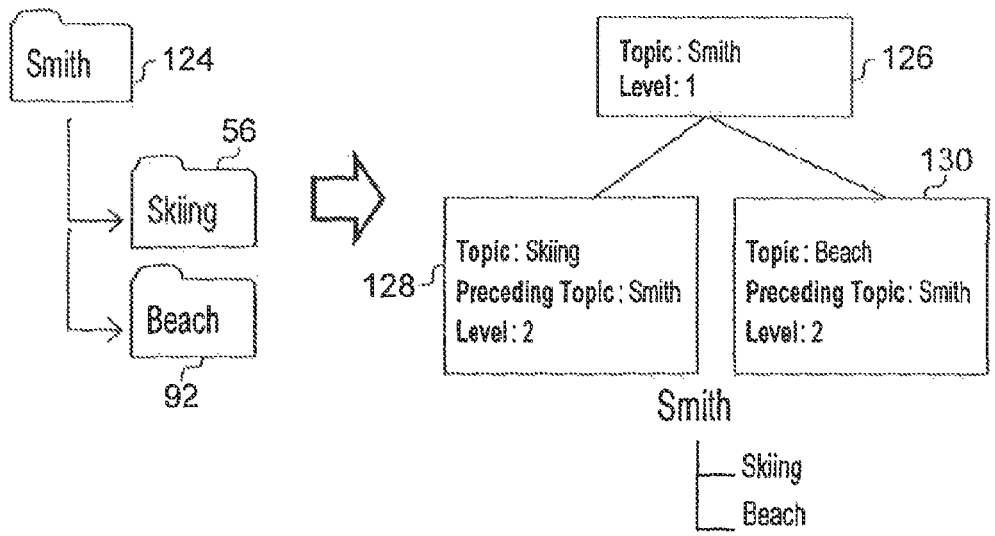
FIG. 12 shows associations between topics.

Topic names may be associated with one another. This can be achieved by generating associations between topic names based on the relationships between the respective storage sets or folders from which the topic names were generated. FIG. 12 shows an example of this. Three folders are shown—"Smith" folder 124, "Skiing" folder 56 and "Beach" folder 92. The latter two folders are subfolders or the "Smith" folder, as shown. The hierarchical folder structure is mirrored in the topic framework where a Level 1 "Smith" topic name is created with two "child" or Level 2 topic names "Skiing" 128 and "Beach" 130. For these two Level 2 folders the preceding topic name ("Smith") is stored, as illustrated. An example of how these topic names and associations are stored is shown in table 114 of FIG. 15.

These associations between topic names can then be presented on the interface 116, for example in Topic Browser 122. An example of this for the associations generated in the example of FIG. 12 is shown in FIG. 16.

Figure 13:
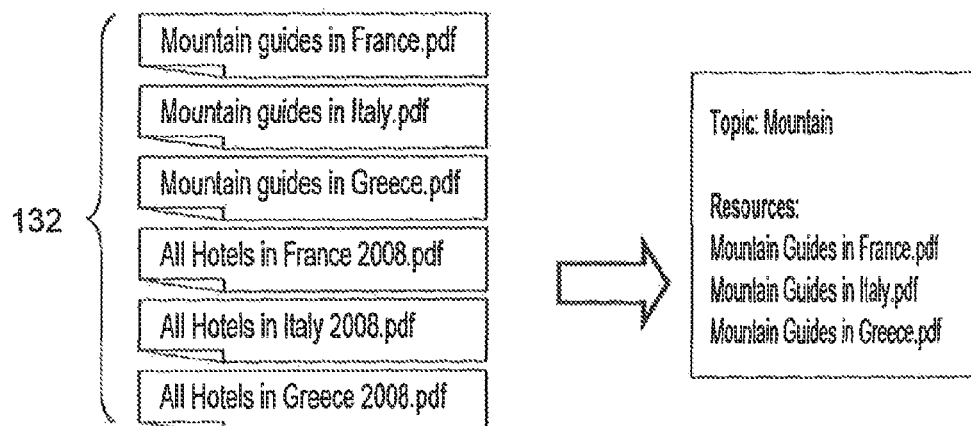
FIGS. 13 and 14 show topics being generated from resource names.

One or more topic names can be generated based on the attributes of individual electronic resources. This can be achieved by selecting a word as a topic name on the basis that the word occurs as an attribute for an electronic resource more than a predetermined number of times. For example, an approach may be used which is based on searching N electronic resources and a word appearing more than m times in an attribute, where m=N/k and k is a predetermined number such as five. An example to illustrate this is shown in FIG. 13. In the six electronic resources 132 shown, the word 'Mountain' appears three times in a small number of resources and is selected as a topic name. The number of words looked at can be set, for example it can be set as three and here '2008' is not selected as a topic because it is not in the first three words. The position of the names in the words can also be used to determine whether or not a word is used as a topic name. In this example 'Guides' is not selected as a topic because it appears only three times in the second word. 'All' is not selected as a topic because it is on an exception list which will be described later. As shown in the figure, the respective electronic resources are associated with the topic name.

An individual electronic resource may have two or more words in its name. Generating one or more topic names based on the attributes of the individual electronic resources (part (b) of Step 20A of FIG. 2) may comprise: selecting one or more words as a topic name based on weighting the likelihood of using a word which occurs earlier in the name more than the likelihood of using a word which occurs later in the name. One example of this has been given above with reference to FIG. 13. Another example is shown in FIG. 14 where "Guides" is now a topic name because it appears a requisite number of times (here, 4) in the second word of the resource names.

It will be appreciated that threshold values may be set in a number of ways in embodiments of the present invention.

Figure 14:
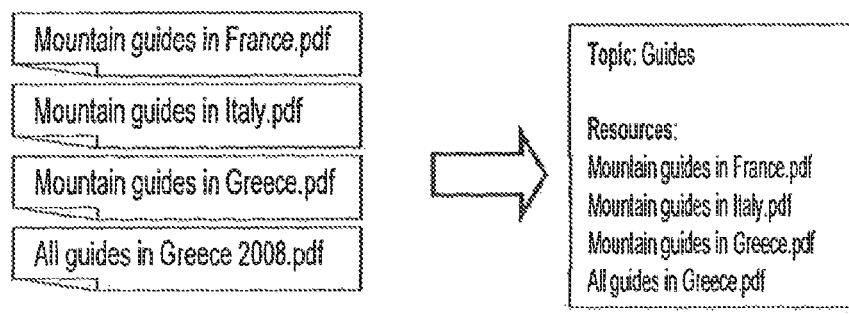

The storing in table 114 of the topic names, electronic resource names and the location information for the examples of FIGS. 13 and 14 is also shown in FIG. 15.

In an embodiment where the storage sets or folders have a hierarchical relationship and one or more electronic resources are stored in a first storage folder lower in the hierarchy than a second storage folder, the method comprises: generating an association between each of the one or more electronic resources and a first topic name based on the name assigned to the first storage folder; generating an association between each of the one or more electronic resources and a second topic name based on the name assigned to the second storage folder; generating an association between the first topic name and the second topic name; and enabling the one or more electronic resources to be accessed through each of a first hierarchical topic view with the first topic name higher in the hierarchy than the second topic name and a second hierarchical topic view with the second topic name higher in the hierarchy than the first topic name.

Figure 17:
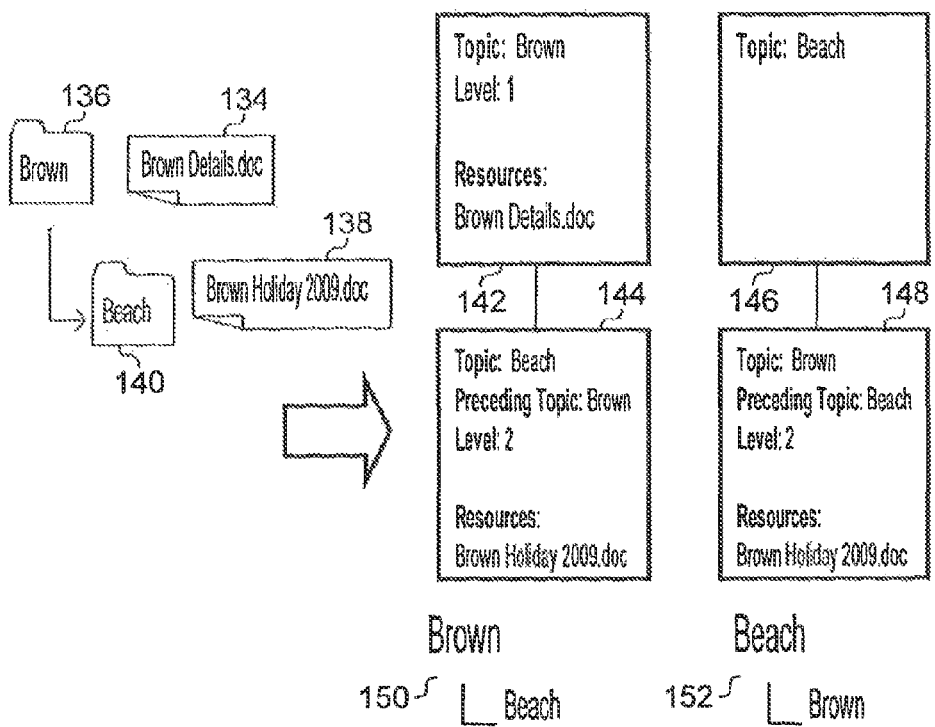
FIG. 17-22 show generating topics and associations.

FIG. 17 illustrates an example of such an embodiment. Electronic resource "Brown Details" 134 is stored in "Brown" folder 136. "Beach" folder 140 is a subfolder of the "Brown" folder 136 (that is, the "Beach" folder 140 is lower in the hierarchy than the "Brown" folder 136). A "Brown Holiday 2009" electronic resource 138 is stored in the "Beach" folder. Two associations are made between the two topic names which are generated based on the set or folder names. The "Brown" topic is associated with the "Beach" topic with a Level 1 to Level 2 association as shown by the association between the "Brown" topic 142 and the "Beach" topic 144. The resources are associated with the topics as shown in the figure. Another association is formed between the topics where the "Beach" topic is associated with the "Brown" topic with a Level 1 to Level 2 association as shown by the association between the "Beach" topic 146 and the "Brown" topic 148. Again, the resources are associated with the topics as shown in the figure. This means that a view 150 starting with the "Brown" topic or a view 152 starting with the "Beach" topic can be used to access these resources. The storage of these topic names, associations, resource names, preceding topics and the locations is shown in table 114 of FIGS. 23(*a*) and (*b*). These associations can be presented on the interface. For example, the views 150 and 152 can be displayed in the topic browser 122 of the interface 116, although these particular views in an interface are not illustrated.

Figure 18:
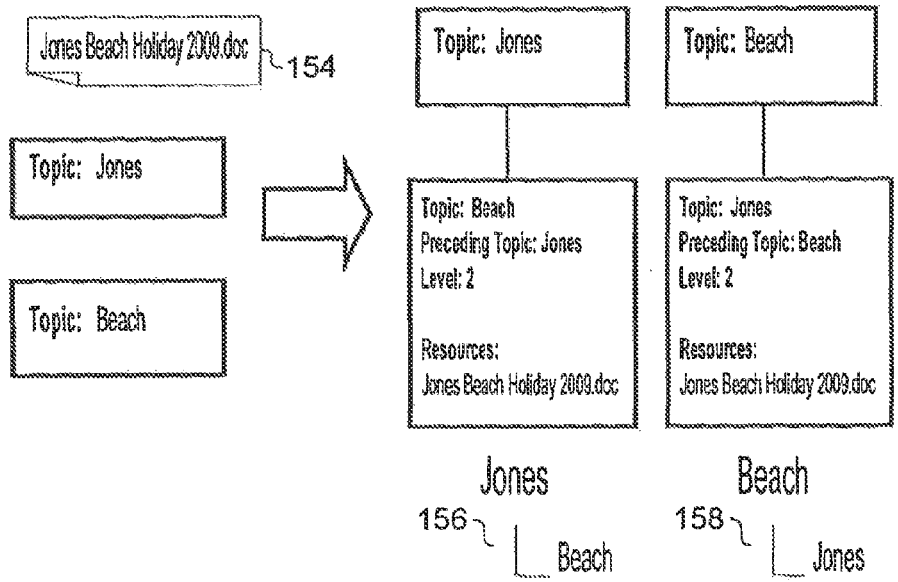

Associating topic names with one another may be achieved by: generating associations between topic names based on multiple topic names being generated based on a single attribute of a single electronic resource. These associations can be presented on the interface. FIG. 18 illustrates this where an electronic resource 154 has two topic names ("Jones" and "Beach") in the name. As shown in the figure, two associations are made—one from Jones to Beach (Level 1: Level 2) and the other from Beach to Jones (Level 1: Level 2) and the electronic resources is associated with the each of the Level 2 topic names, meaning it can be accessed through either of views 156 or 158 in the interface. For example, the views 156 and 158 can be displayed in the topic browser 122 of the interface 116, although these particular views in an interface are not illustrated.

Figure 19:
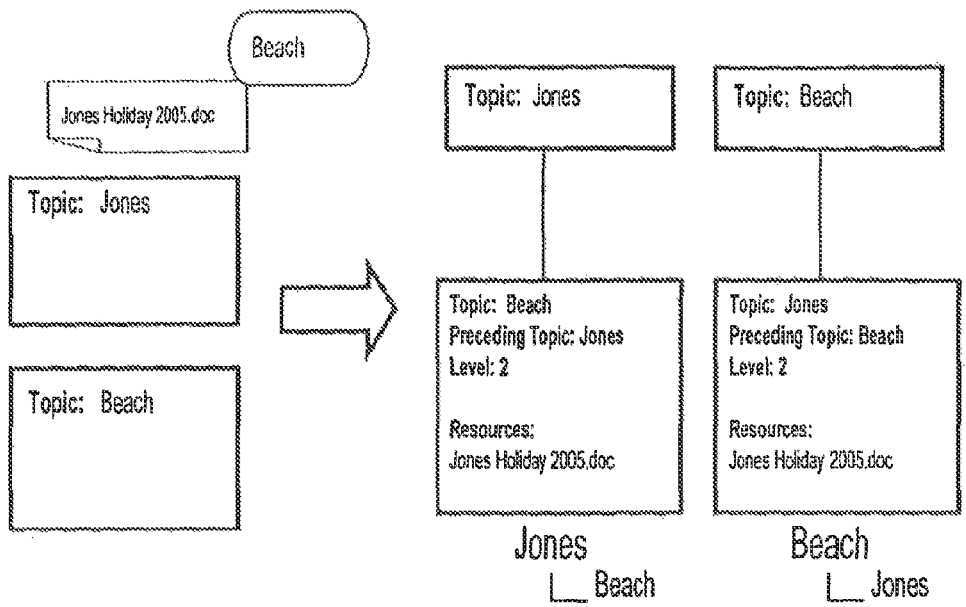
Figure 20:
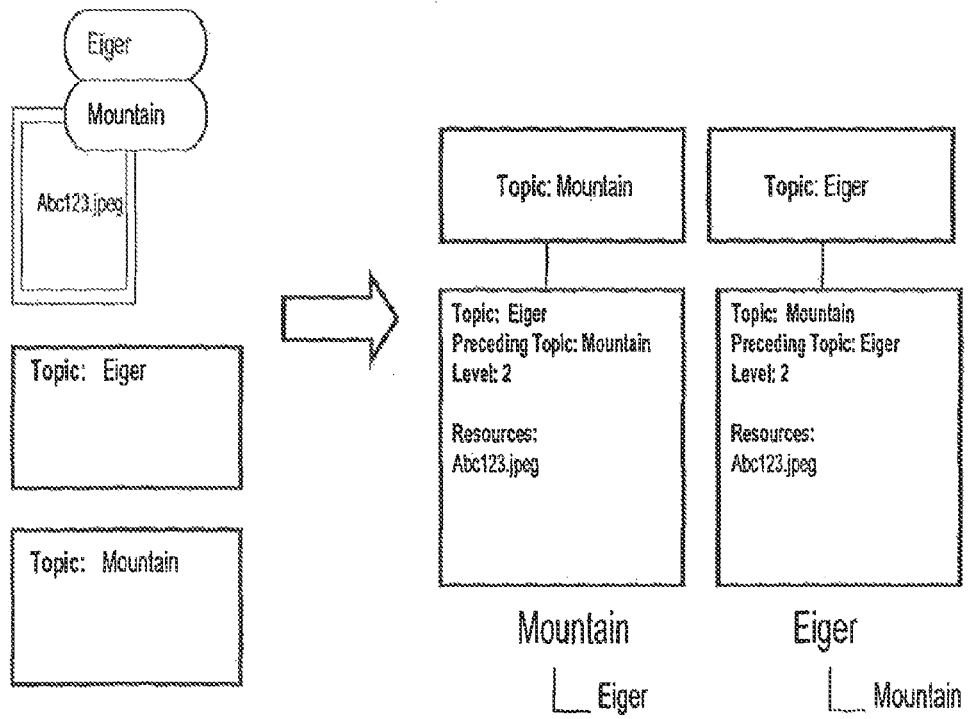
Figure 21:
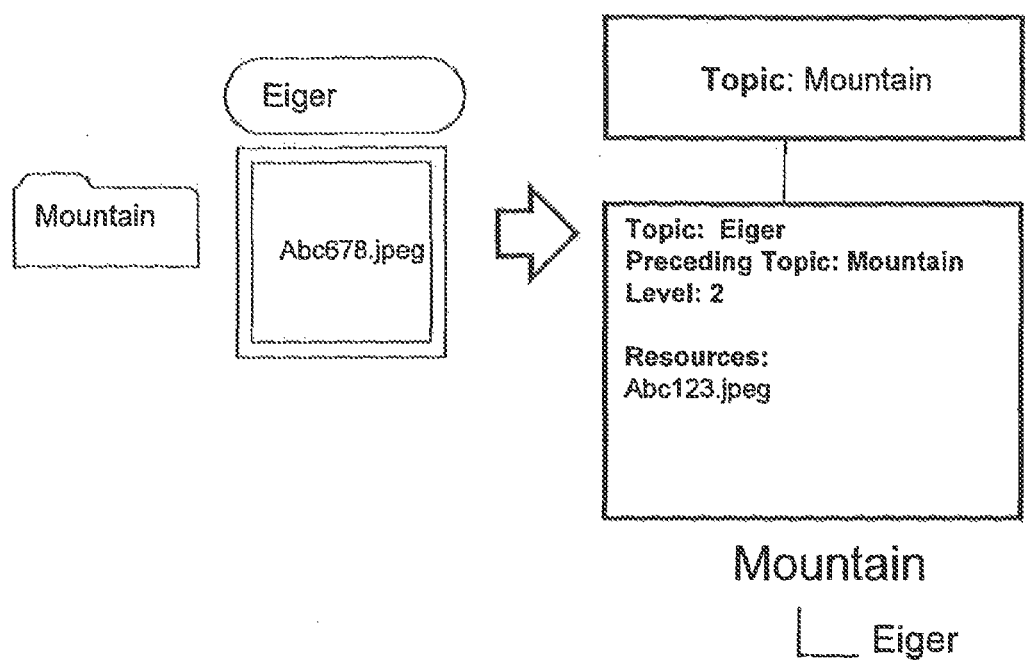

Topic names can be associated in various ways and FIGS. 19 to 21 illustrate some further examples, which will not be discussed in detail as they are self-explanatory in the light of the description of earlier examples and the key of FIG. 3. FIG. 19 illustrates an example of generating associations based on multiple topic names being present in a combination of resource names and keywords/tags. FIG. 20 illustrates an example of generating associations based on multiple topic names being present in keywords/tags. FIG. 21 illustrates an example of generating associations based on a set/folder name and keywords/tags.

Figure 22:
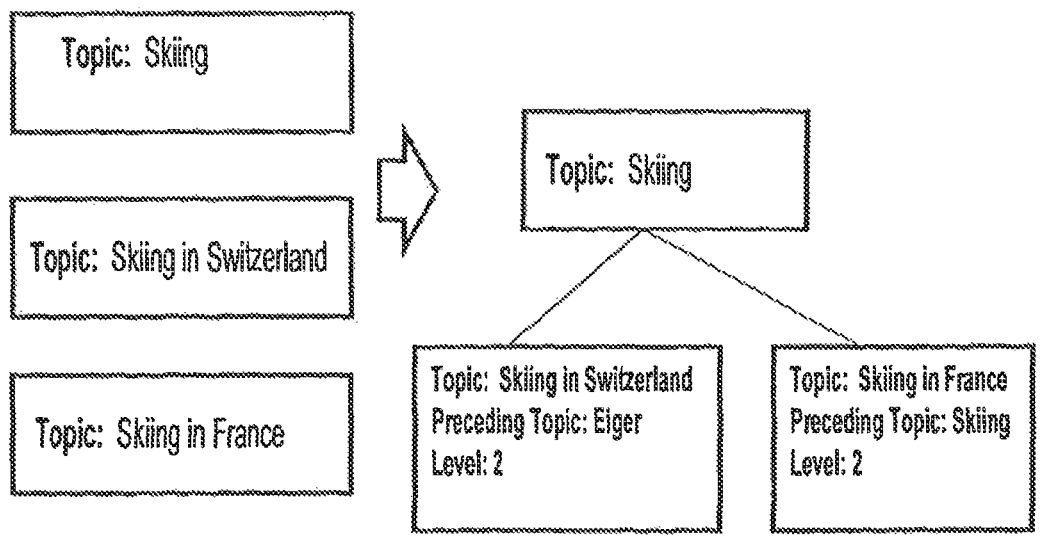

Topic names can be associated with one another by: generating associations between topic names based on a topic name being a subset of the name of another topic name. The associations can be presented on the interface 116. FIG. 22 illustrates an example of generating associations between topic names based on a topic being a subset of another topic. In this example "skiing" is a subset of the "Skiing in Switzerland" topic and the "Skiing in France" topic.

The storing in table 114 of the topic names, electronic resource names and the location information for the examples of FIGS. 17 to 22 is shown in FIGS. 23(a) and (b) (FIG. 23(b) is a continuation of FIG. 23(a)).

FIGS. 24 to 26 illustrate further a examples of step 24 of FIG. 2; that is, the figures show examples of how the topic framework is used to present on an interface 116 a group 118 of stored electronic resources associated with a respective one or more topic names so that one or more of the group of electronic resources can be selected for access. The table 114 of FIGS. 23(a) and 23(b), or more specifically the data in it, can be used to generate interface 116 and if one of the electronic resources 118 is selected the resource can be accessed using the location information stored in the table. Optionally, the topic browser 122 may be displayed as part of the interface 116. Topics can first be selected in the Topic list (for example: "Jones" in FIG. 24; "Skiing" in FIGS. 25 and 26. The user input or selection of the topics are depicted as dashed boxes in the figures (c.f. the key of FIG. 3)). The selected topic and its associations with other topics can be displayed in the topic browser 112 (for example: the association between "Jones" and "Beach" is shown in FIG. 24; the associations between "Skiing" and each of "Skiing in France" and "Skiing n Switzerland" are shown in FIGS. 25 and 26). If the user selects a particular topic name in the topic browser 112 (as illustrated by the dashed boxes in the figures), the electronic resources associated with that topic are listed in the Resources part of the interface 118. That is, the group of electronic resources associated with the particular selection is displayed. Selecting a resource will provide access to the electronic resource, which for resources such as Word documents can be referred to as opening the document.

As will be appreciated from the descriptions of FIGS. 12, 15, 16, 17, 18, 19, 20, 21, 22, 23(a)/(b), 24, 25 and 26, associations between topic names can be hierarchical associations. Embodiments may comprise presenting on the interface the hierarchy between topic names, as illustrated in these figures. In the described embodiments the hierarchical nature of these associations is stored by assigning levels to the topic names and by storing the preceding topic name for a lower level. For example, with reference to FIGS. 23(a)/(b) and 24, the Jones-Beach hierarchy where Beach is lower in the hierarchy than Jones is stored in rows 160 and 162 of FIG. 23(b). There are two rows as there are two resources which are associated with this particular view. As can be seen for the two electronic resources "Jones Beach Holiday 2009" and "Jones Holiday 2005", "Beach" is stored as a level 2 topic with "Jones" as the preceding topic. It will be appreciated that the relevant data can be stored in a variety of different ways.

There is some flexibility over which electronic resources to include in a group for a particular selected topic. For example, with reference to FIG. 24, when "Jones" is selected, the resources only associated with the Jones topic at that level could be displayed (and not those associated in the Beach topic). Alternatively, the resources in the "Beach" sub topic may also displayed when the "Jones" topic is displayed.

In some embodiments, the group of stored electronic resources associated with each of the topic names in the hierarchy are displayed for a topic name lower in a hierarchy than other topic names. For example, with reference to FIG. 24 with "Beach" selected only the resources associated with "Beach" and "Jones" are displayed on the interface, as shown.

Figure 27:
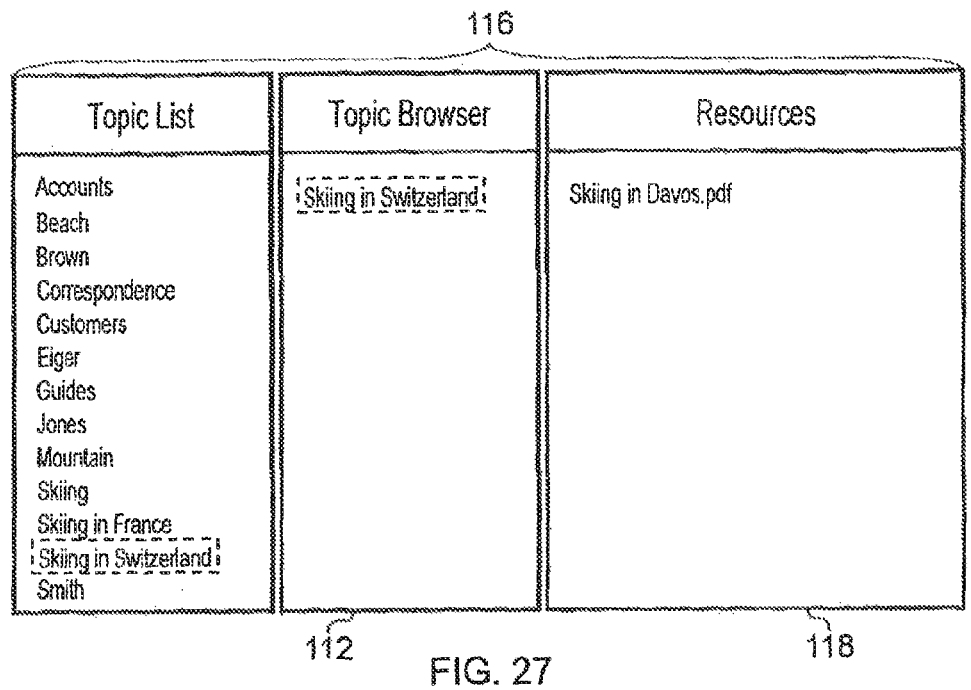

It will be appreciated that different topic names can be selected on the interface, and that in response to selection of a topic name, a respective group of stored electronic resources associated with the selected topic name is presented. FIGS. 11, 24, 25 and 26 show examples of this where the selected topic is outlined with a dashed box. The group of electronic resources are shown in the Resources part 118 of the interface 116. FIG. 27 shows another example.

In some embodiments it is possible that one or more electronic resources are not associated with any topic names. Electronic resources with no associations with a topic name can be searched for and presented as a list. A user can then determine one or more new topic names for association with one or more of those electronic resources or can associate one or more existing topic names with the electronic resources.

Figure 28:
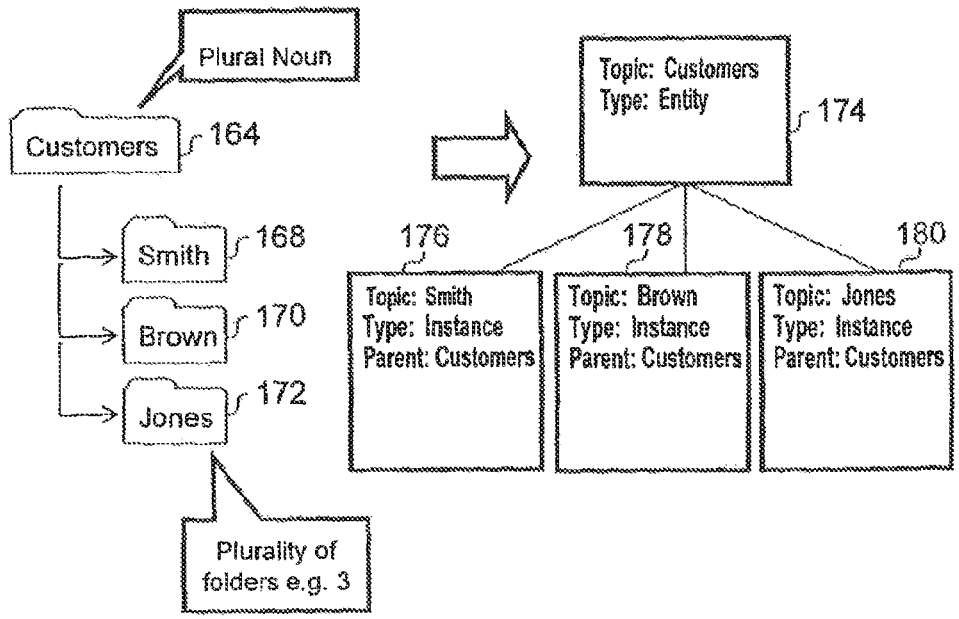
FIG. 28 illustrates determining entity-instance associations.

In some embodiments, the method of FIG. 2 may further comprise: determining that a topic name is an entity and that one or more other topic names are instances of the entity; associating, using one or more entity-instance associations, the topic name of the entity with the topic names of the one or more instances of the entity; and presenting on the interface the entity-instance associations between topics. This can be achieved by processing the names of the storage sets and identifying a name of a storage set as a plural noun. The topic name generated from such as storage set name can be identified as an entity. Alternatively or additionally, the hierarchical relationship of the storage sets can be used to identify entity-instance associations. For example, a topic name which is generated from the name of a storage set which has a plurality of sub-storage sets can be given an entity-instance association with the topic names generated from the names of the sub-storage sets. FIG. 28 illustrates an example of this. With reference to FIG. 28, a folder arrangement where a Customers folder 164 has three sub folders, Smith 168, Brown 170 and Jones 172 is shown. "Customers" is a plural noun and this folder has a plurality of sub-folders, and these characteristics identify the Customers-Smith, Customers-Brown and Customers-Jones associations as entity-instance associations. The Entity-Instance associations between the topic names "Customers" 174 and "Smith" 176, "Brown" 178 and "Jones" 180 are shown in the figure.

One way of storing the entity-instance associations is shown in FIGS. 29(a) and (b) (FIG. 29(b) is a continuation of FIG. 29(a)). Two new columns are added to table 114: Type 182 and Parent 184. In the type column, whether a topic name is an entity or instance is stored, as shown for example in rows 186, 188, 190 and 192 of FIG. 29(a). For the three instance topics stored in rows 188, 190 and 192 the name of the entity or parent topic "Customers" is also stored, as shown.

Figure 30:
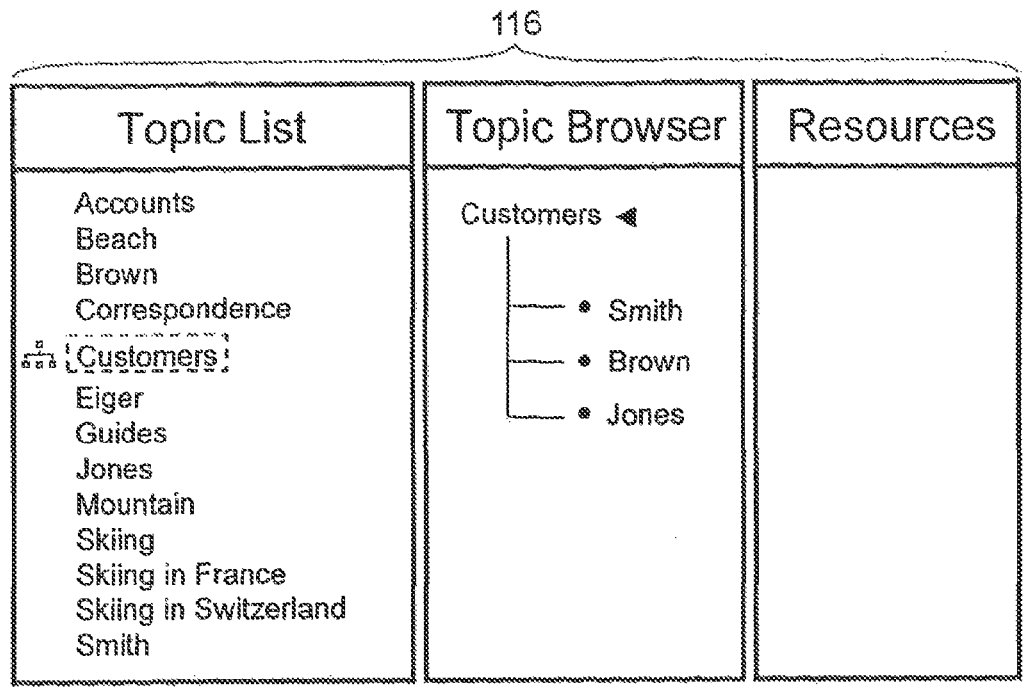
FIG. 30 shows an interface.

FIG. 30 illustrates how these entity-instance associations can be displayed in on the interface 116.

As will be appreciated from the above, in one embodiment, determining that a topic name is an entity and that one or more other topic names are instances of the entity comprises: determining from the names assigned to storage folders and the relationships between the respective storage folders that: a topic name is an entity if the name of the respective storage folder is a plural noun and the respective storage folder has a plurality of sub storage folders; and a topic name is an instance if the respective storage folder is one of the plurality of sub storage folders.

Figure 34:
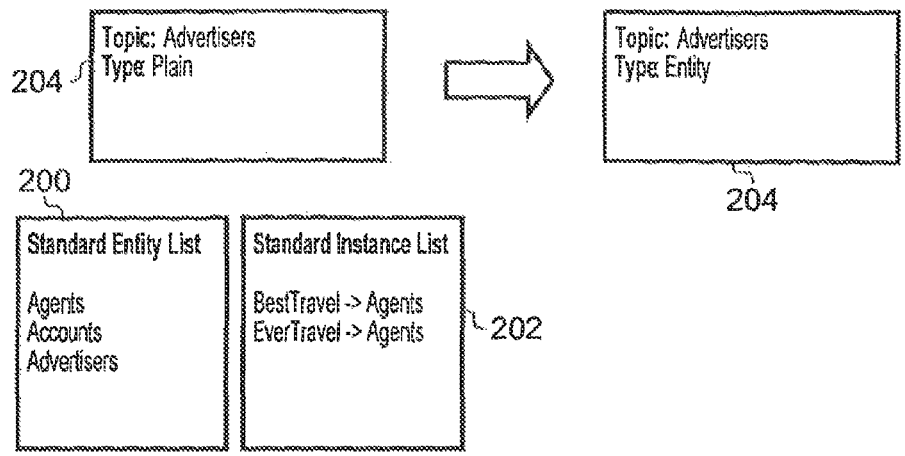
FIGS. 34 and 35 illustrate determining entities and instances.
Figure 35:
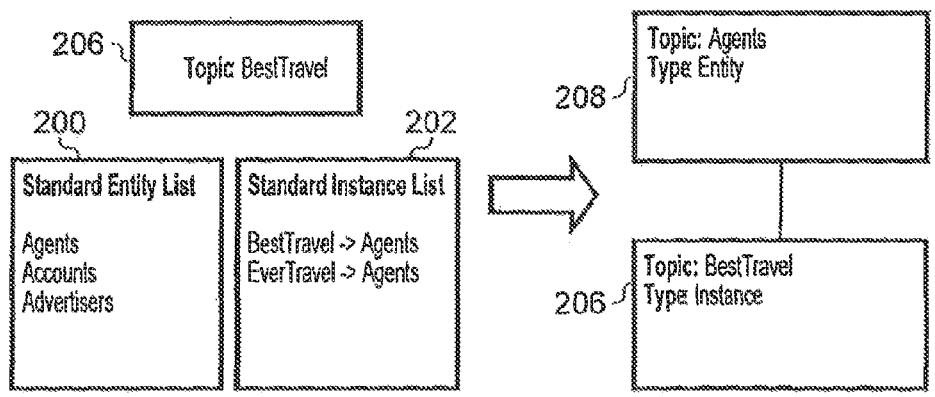

Additionally or alternatively, determining that a topic name is an entity and that one or more other topic names are instances of the entity may comprise: determining that a topic name is an entity by referring to a standard entity list; and/or determining that a topic name is an instance by referring to a standard instance list. This can be achieved by checking each topic name against a standard list. Examples of a standard entity list 200 and a standard instance list 202 are shown in FIGS. 34 and 35. With reference to FIG. 34, the name of a "plain" topic "Advertisers" 204 can be compared with the standard entity list. If the topic name exists in the list, the type of the "Advertisers" topic can be changed to "Entity". Similarly, with reference to FIG. 35 the name of a "plain" topic "BestTravel" 206 can be compared with the Standard Instance List which contains a predefined list of instances and corresponding entities. If the topic name exists in the list, the type of the "BestTravel" topic is changed to "instance" and that topic is associated with the corresponding entity which is listed in the list. That is, a corresponding association is formed which in this example is between the entity topic "Agents" 208 and the instance topic "BestTravel" 206.

Figure 31:
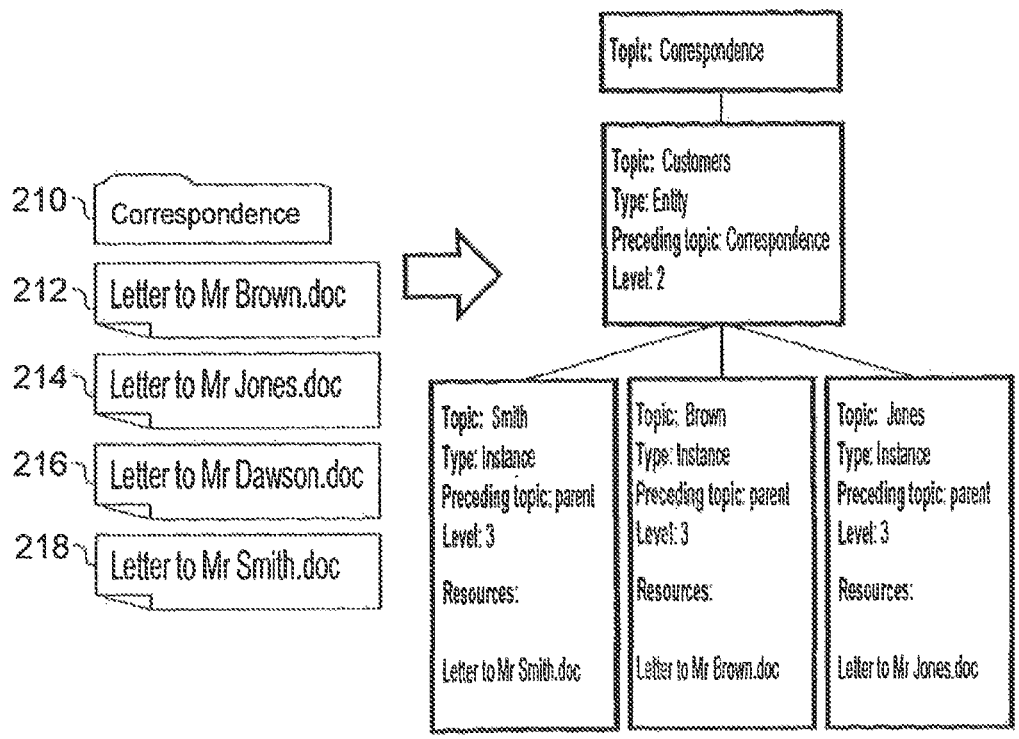
FIG. 31 illustrates grouping by entities.
Figure 32:
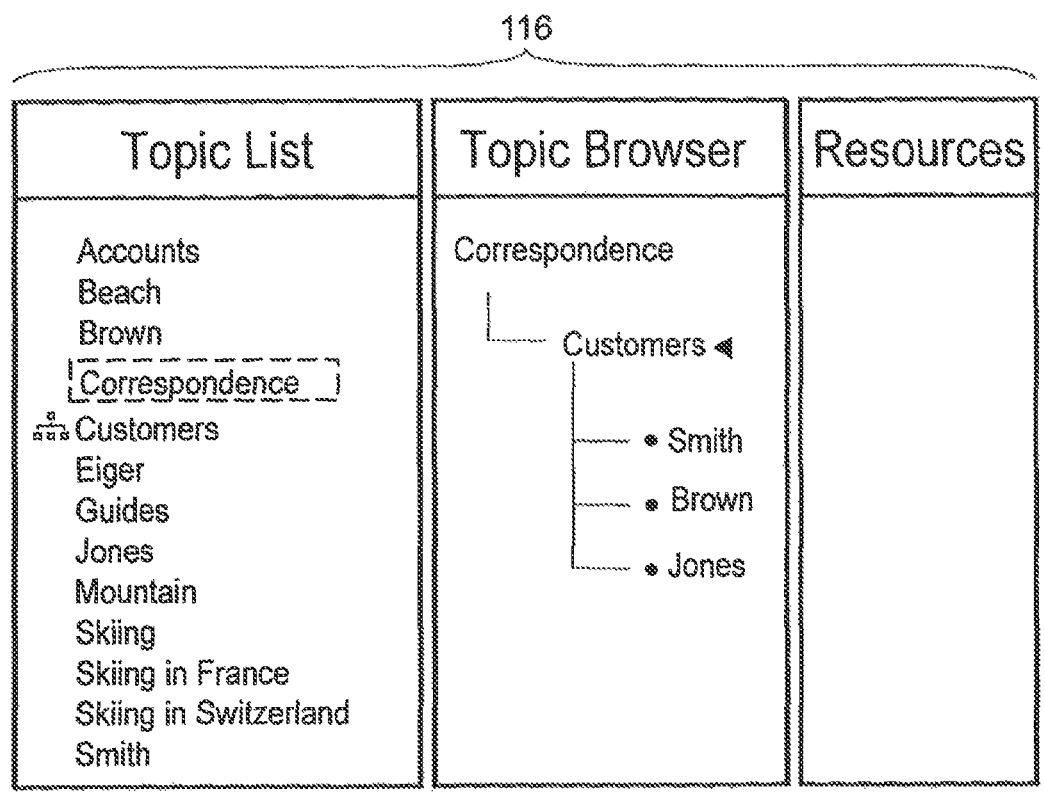
FIG. 32 shows an interface.

FIG. 31 shows an example of grouping by entities. With reference to FIG. 31, it is possible that a storage set such as Correspondence folder 210 contains electronic resources which are associated with another topic. For example, folder 210 contains electronic resources 212, 214 and 218 which are associated with topics "Brown", "Jones" and "Smith" respectively. As Brown, Jones and Smith are instances of "Customers", the topic framework can be arranged so that Customers becomes a sub-topic (or level 2 topic) of Correspondence, with Smith, Brown and Jones being sub-topics of Customers at a third level, or level 3, in the hierarchy. FIG. 32 shows how these associations can be displayed on the interface 116; and FIGS. 33(a) and (b) show an example of how the data can be stored in table 114 (FIG. 33(b) is a continuation of FIG. 33(a)).

In some embodiments, the method of FIG. 2 may further comprise: determining that a topic name is a composite body and that one or more other topic names are members of the composite body; associating, using one or more composite-member associations, the topic name of the composite body with the topic names of the one or more members of the composite body; and presenting on the interface the composite-member associations between topics. A composite body topic can be considered as a topic composed of or made up from several member topics. This association can also be referred to as a whole-part association.

Determining that a topic name is a composite body and that one or more other topic names are members of the composite body may comprise: determining that a topic name is a composite body by referring to a standard composite list; and/or determining that a topic name is composite member by referring to a standard composite member list.

Figure 36:
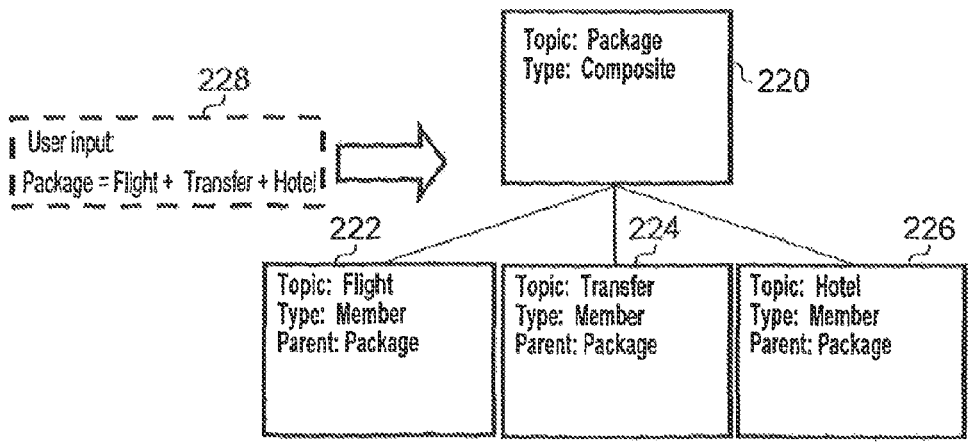
FIG. 36 illustrates forming composite-member associations.

Additionally or alternatively, the composite-member associations may be defined by user input. FIG. 36 illustrates an example of composite-member associations for a "Package" topic 220 composed of "Flight", "Transfer" and "Hotel" topics 222, 224, 226, which have been created through a user input 228.

FIGS. 37(a), (b) and (c) show an example of how the data can be stored in table 114 (FIG. 37(c) is a continuation of FIG. 37(b) which is a continuation of FIG. 37 (a)).

In some embodiments, the method of FIG. 2 may further comprise: allowing a user to modify the topic structure by one or more of adding a topic name to the topic framework; removing a topic name from the topic framework; adding an association between an electronic resource and one or more topics names; removing an association between an electronic resource and one or more topic names; adding associations between topic names; and removing associations between topic names. This can be achieved by, for example, providing a drop down menu or the like to give the option of modifying the topic structure. Any modifications can be stored in or, as the case may be, deleted from table 114.

In some embodiments, the method of FIG. 2 may further comprise: adding new associations and topic names to the topic framework as new electronic resources and/or named storage folders are added. This can be achieved by checking the names and attributes of the storage folders and electronic resources as they are added, or by checking these at set times.

Figure 38:
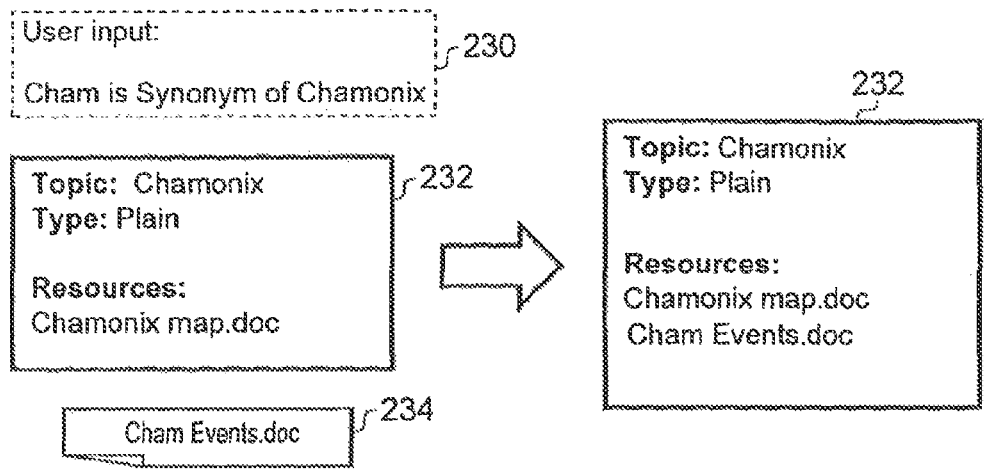
FIG. 38 illustrates associating synonyms.

In some embodiments, the method of FIG. 2 may further comprise associating synonyms with one or more topic names. This may be achieved by processing user input that a word is a synonym of another word. An example of this is shown in FIG. 38 where "Cham" has been entered as a synonym of "Chamonix" by user input 230. The effect of this is that electronic resources such as Cham Events 234 containing the synonym (here "Cham") will be associated with the Chamonix topic 232, as depicted in the figure.

Figure 39:
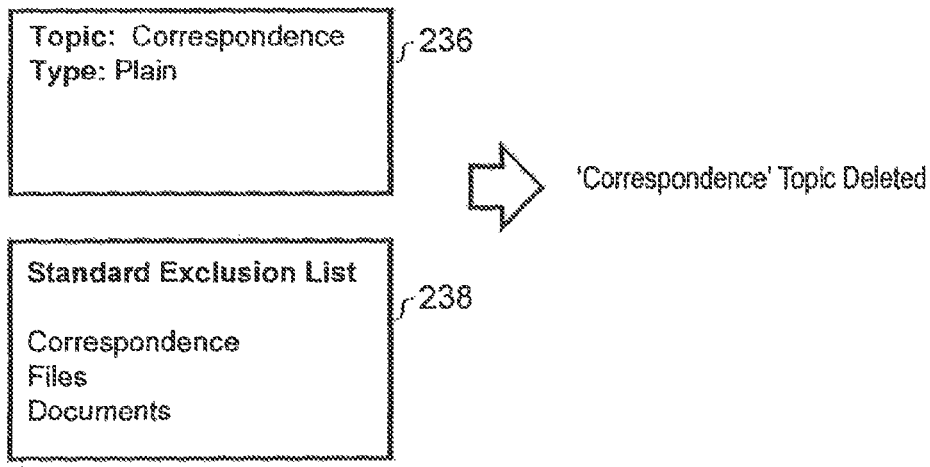
FIG. 39 illustrates removing topics using an exclusion list.

In some embodiments, the method of FIG. 2 may further comprise removing from the topic framework topic names that are on an exclusion list. An example of this is shown in FIG. 39 where the topic "Correspondence" 236 is in the standard exclusion list 238 and is therefore deleted.

Figure 40:
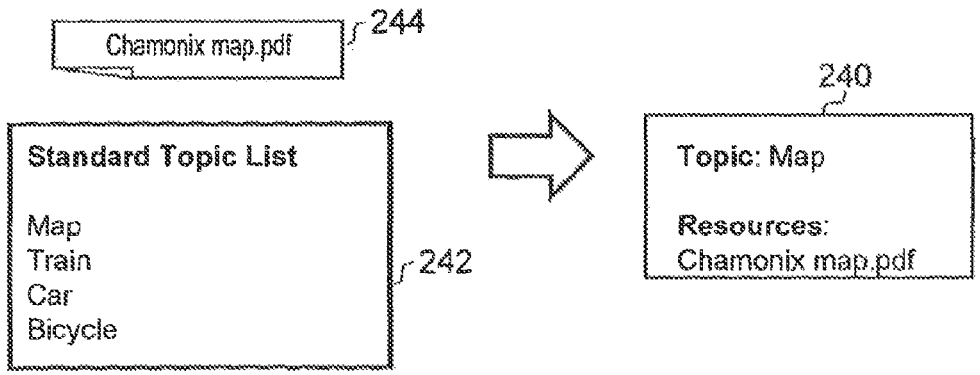
FIG. 40 illustrates adding topics from a standard list.

In some embodiments, the method of FIG. 2 may further comprise adding to the topic framework standard topics names from a standard topic list. An example of this is shown in FIG. 40 where the topic "Map" 240 is generated because it is in the standard topic list 242. As shown in the figure, the "Chamonix map" resource 244 is associated with the "Map" topic 240.

Figure 44:
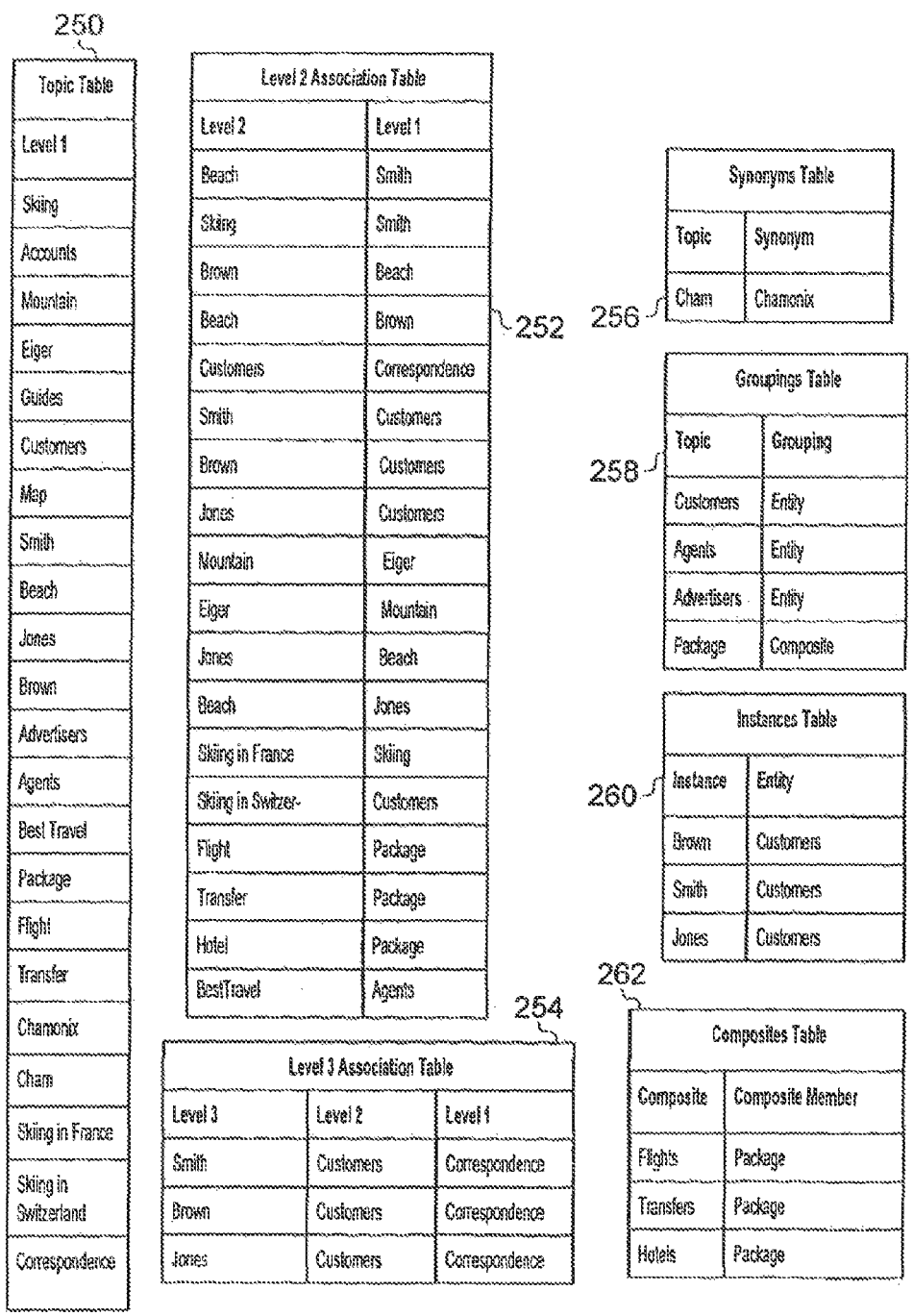

FIGS. 41(a), (b) and (c) show an example of how the data can be stored in table 114 (FIG. 41(c) is a continuation of FIG. 41(b) which is a continuation of FIG. 41(a)). It will be appreciated that the data can be stored in different ways. For example, the data tables can be normalised. A normalised version of the data tables is shown in FIGS. 42, 43 and 44.

Figure 45:
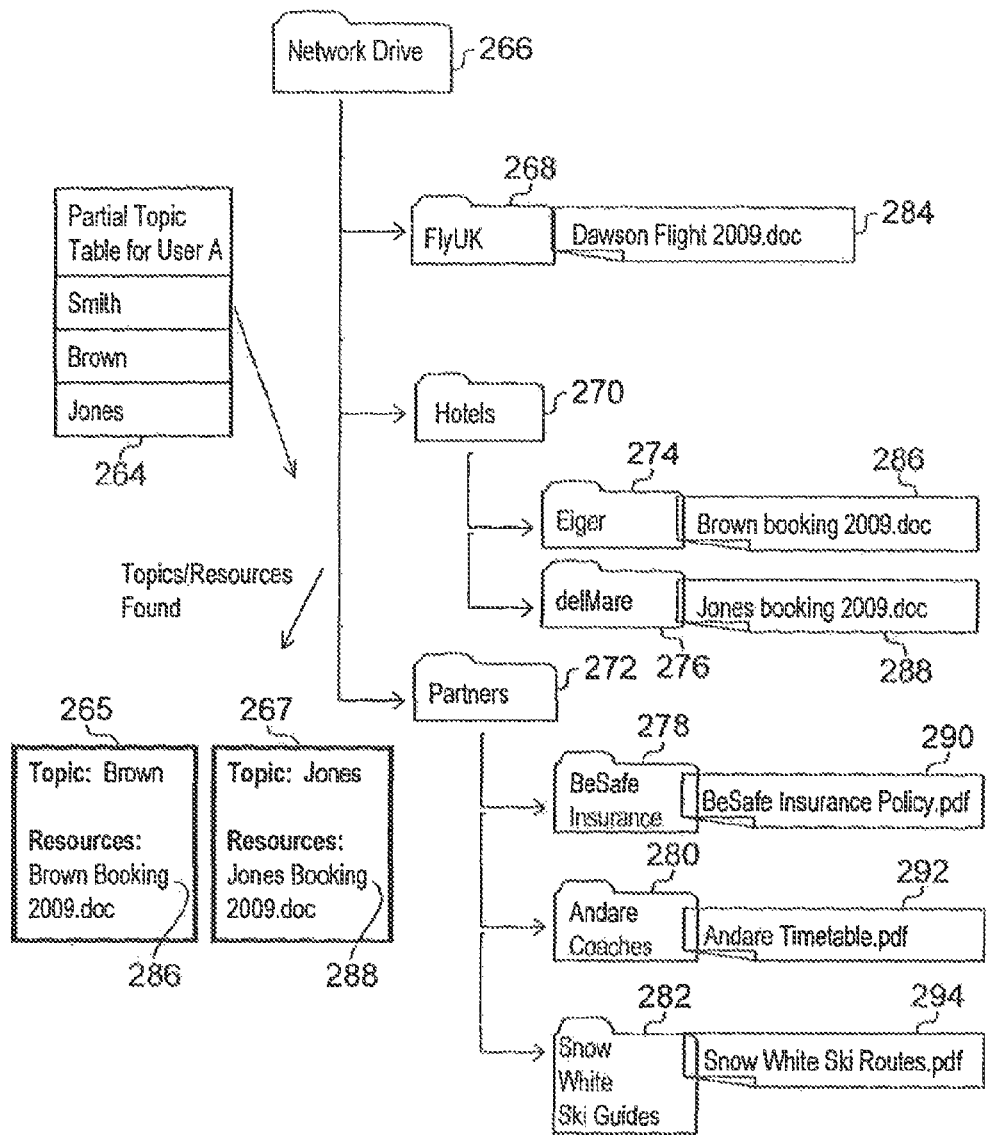
FIG. 45 illustrates interrogating a location.

In some embodiments, a method may comprise: interrogating or searching a source location to identify one or more resources in the source location which are related to topic names of the topic framework. For example a user may have their own topic framework for their own storage set such as a hard drive of a computer system and may wish to check to see if there is anything relevant on a network drive. FIG. 45 shows an example of this. In the figure, part of a topic framework 264 is shown. A network drive 266 has the folder structure containing folders 268, 270, 272, 274, 276, 278, 280 and 282 as shown. Various electronic resources 284, 286, 288, 290, 292 and 294 are stored in the folders as shown. Each electronic resource in each folder and/or the folders can be searched to identify topic names (and their associated electronic resources) which are in the topic framework 264—for example, by constructing and populating a table similar to table 114 of FIG. 6. The table can be searched for topic names in the user's topic framework. In the present example, there two such topic names "Brown" 265 and "Jones" 267 and these, together with their associated resources, are listed as the topics/resources found as shown in the figure.

A team topic framework can be set up. The team topic framework can be determined where each of a plurality of users has their own topic framework which has created in accordance with the method of FIG. 2. The team topic framework can be determined by: providing access for the plurality of users to a shared resource location comprising shared electronic resources; determining for each of the plurality of users which of the electronic resources in the shared resource location are associated with topic names of the user's topic framework and determining a team topic framework by combining these topic names from the plurality of users. An example of this will be described with reference to FIGS. 46 to 48, as well as the just described FIG. 45.

Figure 46:
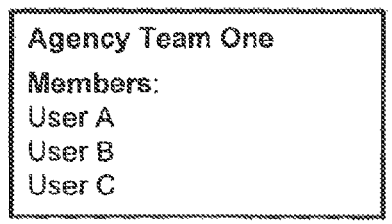
FIG. 46 illustrates a team set up.
Figure 47:
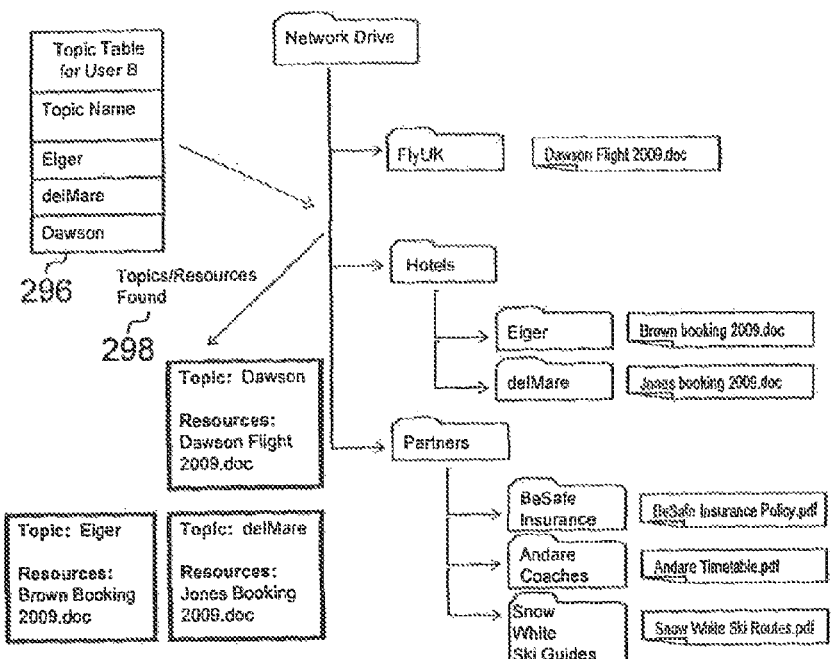
FIGS. 47 and 48 illustrate different users interrogating a location.
Figure 48:
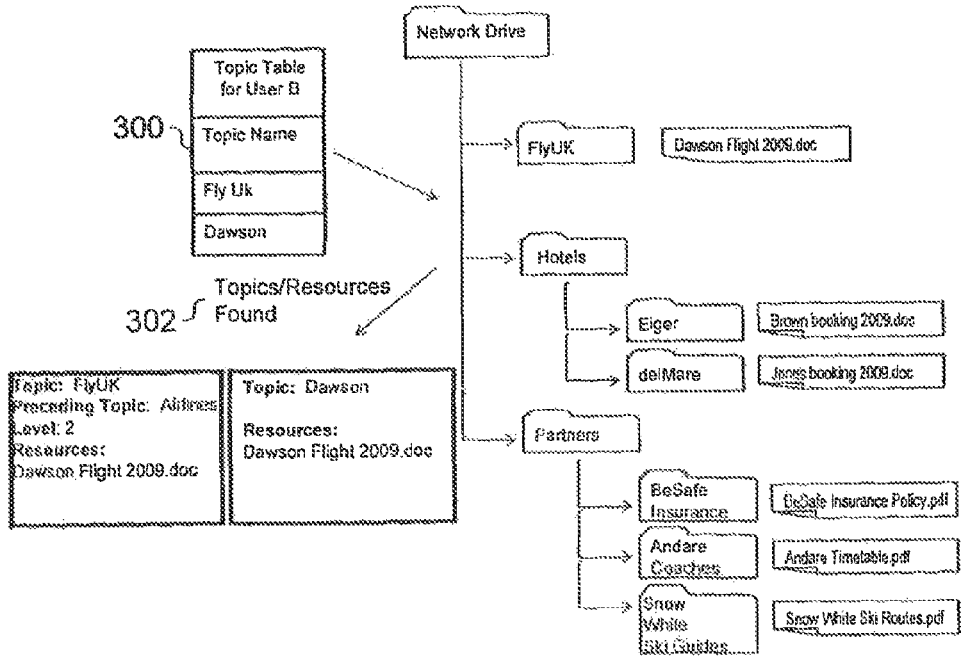

FIG. 46 shows a team—"Agency Team One"—which has three members: User A, User B and User C. Referring back to FIG. 45, the result of User A interrogating or searching a particular location using their topic table was described. The resulting topics/resources found are the first part of the team topic framework. User B has a different topic framework 296 and if user B uses their topic framework to interrogate or search the same location, different topics and resources 298 are found as shown in FIG. 47. These are added to the team topic framework. Similarly, user C has a different topic framework 300 and if user B uses their topic framework to interrogate or search the same location, different topics and resources 302 are found as shown in FIG. 48. These too are added to the team topic framework.

Each user can view the team topic framework and associated resources as shown in FIG. 49. Each user can view the team topic framework in addition to their own topic framework as shown for user A in FIG. 50 which shows User A's topic framework. Column 304 entitled "Share" shows whether the topic and resources is part of User A's topic framework of part of the shared Agency Team One team framework. User A is able to decide to share a particular resource by changing the "Share" setting from User A to "agency Team One" as shown, for example, for entry 306 in FIG. 51 which shows User A's framework. The topics and resources that are set as being in the Agency Team One team topic framework can be accessed by each of the users in the team as shown in FIG. 52 which shows the team topic framework, which is accessible by any of users A, B and C.

Additionally or alternatively, a team topic framework can be set up by: generating a team topic framework comprising team topic names for a team using a shared resource location comprising shared electronic resources by performing the method of FIG. 2; and enabling each of the plurality of users in the team to add or delete topic names from the team topic names to create their own personalised team-based topic names. An example of this will be described with reference to FIGS. 53 to 59.

In Agency Team 2 there are four users—Users A to a User A contributes the topics and resources shown in FIG. 53; User B contributes the topics and resources shown in FIG. 54; user C contributes the topics and resources shown in FIG. 55; User D contributes the topics and resources shown in FIG. 56. All resources in these topics can now be seen by each of the members of the team; that is, each team member can see and access the resources shown in FIGS. 57(a) and (b). Additional associations can be generated for the team topic framework such as those shown in FIG. 58.

FIG. 59 shows how these topics can be displayed on the interface. If a user filters his topic framework by Agency Team 2, he will see the same view as another of the team members who filters his view in the same way. Each user may additional see electronic resources that were kept as personal resource, i.e. which were unshared with the team.

An organisation topic framework can be created. This can be done by: creating an organisation topic framework for an organisation by performing the method of FIG. 2 for the organisation's electronic resources and/or by aggregating topic names from individual user's topic frameworks which have been created using a method of FIG. 2. This approach can also be used by a corporate information manager who chooses the topics that each person will and then only takes information which is marked appropriately, for example as "internal final", to show to the rest of the organisation, for example using an intranet. In this example the control of who provides what topics is now centrally managed and only documents marked internal (to the organisation) and final version are used. So, if for example the information Manager for EnjoyIt Travel was to Select Customers from User A, Holidays from A, Airlines from User B, Hotels from User C and Partners from User D, this would automatically pull in all the topics and Resources for Users A, B, C, D.

In some embodiments, at least part of the organisation topic framework can be used to associate topic names with electronic resources on an intranet site.

Figure 60:
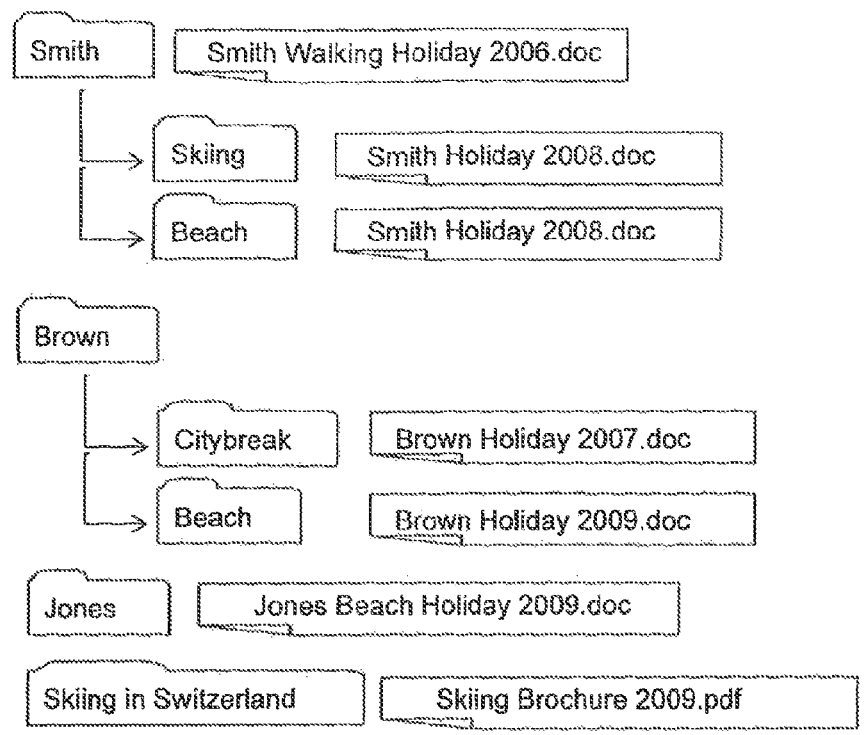
FIGS. 60 and 61 illustrate using a topic framework to change a folder structure.
Figure 61:
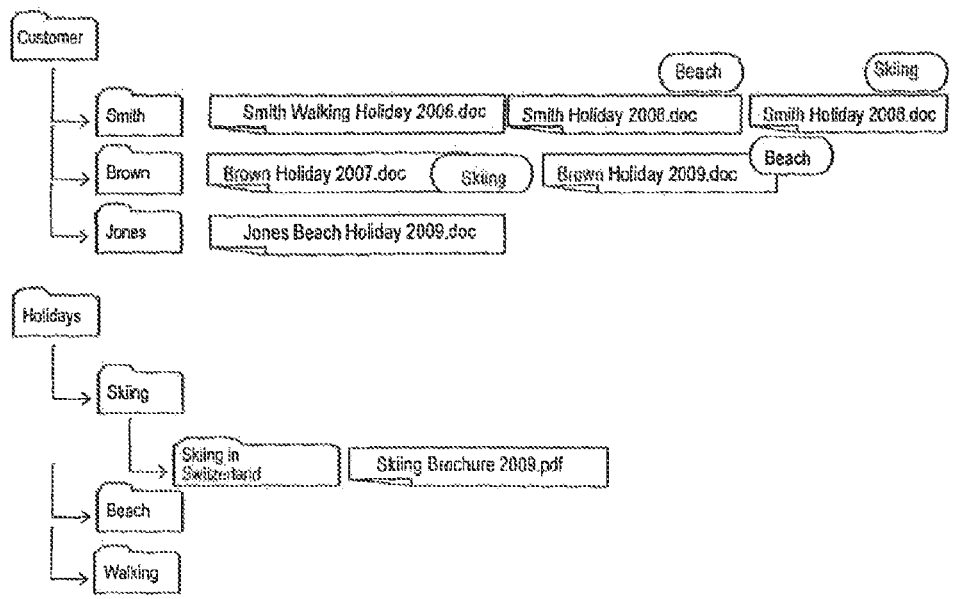

In some embodiments in which a topic framework has been created using the method of FIG. 2, the topic names of the topic structure can be used to change the names or relationships of the named storage folder based on the topic names. For example, the folder structure of FIG. 60 can be changed to the one shown in FIG. 61, by naming the folders in accordance with the topic names of the topic framework derived from the FIG. 60 folder structure. The topic framework and interface would typically still be used to access the resources in the changed folder structure, but the folder structure itself would typically mirror the topic structure more closely than it originally did. When reorganised in this way, duplicate files can be removed (based on filed having same filename/same content/same size), duplicate folder names can be removed, all the groupings such as entity-instance and composite-member associations can be applied and associations between a resource in one folder with another folder can be formed using keywords, all as shown in FIG. 61.

When a topic framework has been created using the method of FIG. 2, the results of a search can be partitioned based on the topic names of a user's topic framework. This can be used for both web-based and desktop searching.

Figure 62:
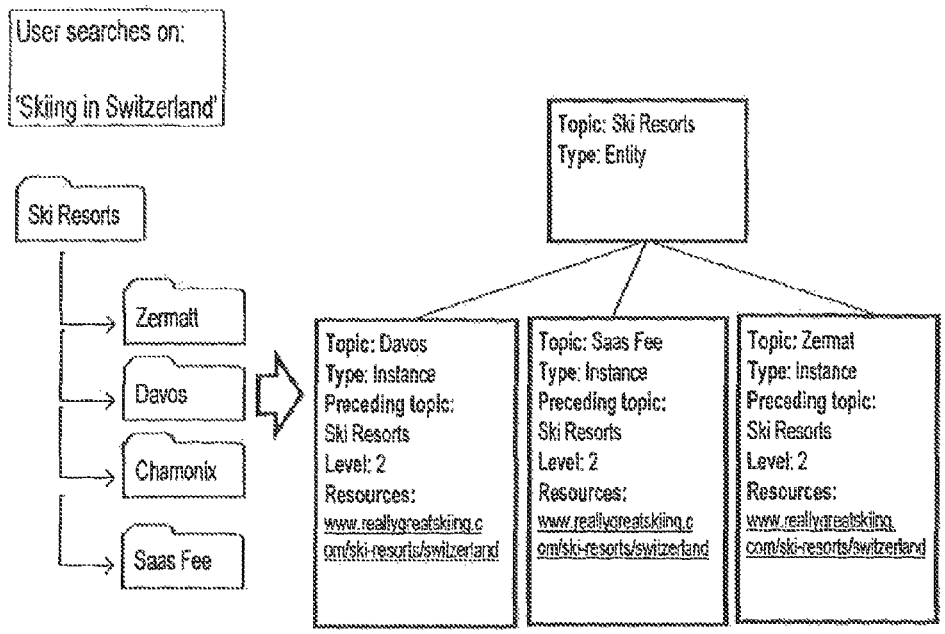
FIGS. 62-65 illustrate using the topic framework to filter search results.
Figure 63:

FIGS. 62 and 63 show an example of extracting additional information from a web based search. Here a user conducts a web search and enters the search string 'Skiing in Switzerland'. The topics in the users topic framework can be used to search through the results and identify results with word in them that correspond to topics found in the user's framework. On the seventh page of the search results the topic Ski Resorts is found in the result as well as instances of that topic Davos, Saas Fee and Zermat. The web link can then be added as a resource association to each of these three topics.

Figures 64, 65:
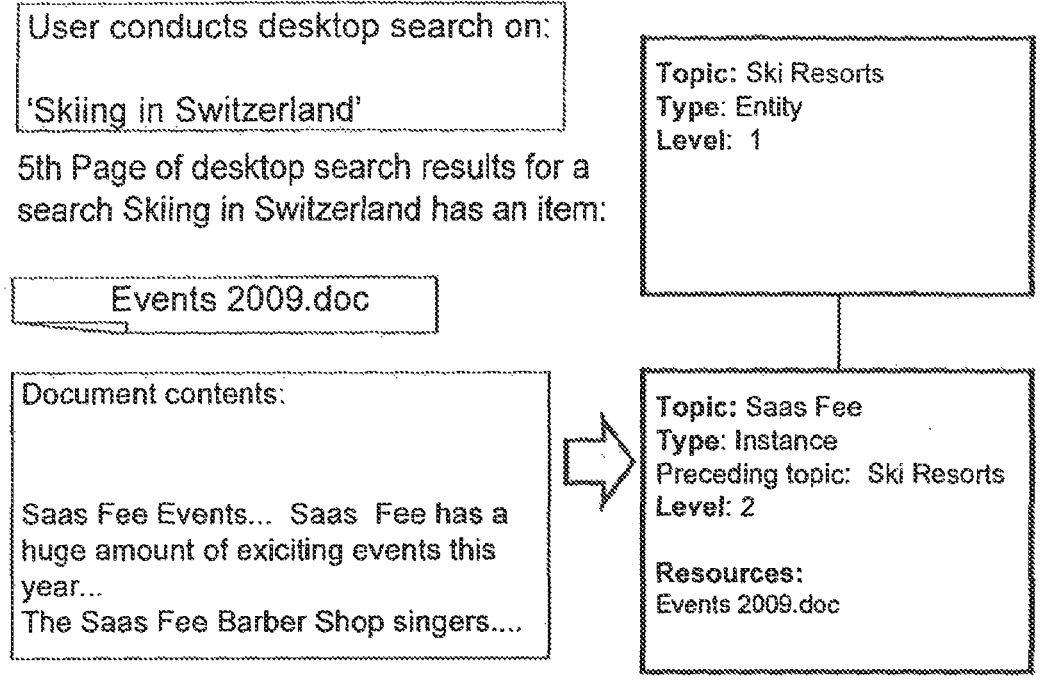

FIGS. 64 and 65 show an example of extracting additional information from a desktop search. A user conducts a desktop search and enters the search string 'Skiing in Switzerland'. The topics in the user's topic framework can be used to search through the results and identify results with word in them that correspond to topics found in the user's framework. On the fifth page a document titled 'Events 2009.doc' is found which contains a number of references to 'Saas Fee' which is a topic and an instance of the entity 'Ski Resorts'. The document can be added as resource association to the topic 'Saas Fee'.

In some embodiments, a user can create as a topic name in the topic framework a task to which one or more electronic resources can be associated to group together the one or more electronic resources to complete a particular task requiring access to the one or more electronic resources. This is useful when performing a particular task or activity which requires a particular set of resources, but which in time may not be required once the task has been completed. It is useful as it provides an efficient way of collating the same set of resources when the task is revisited.

Figure 66:
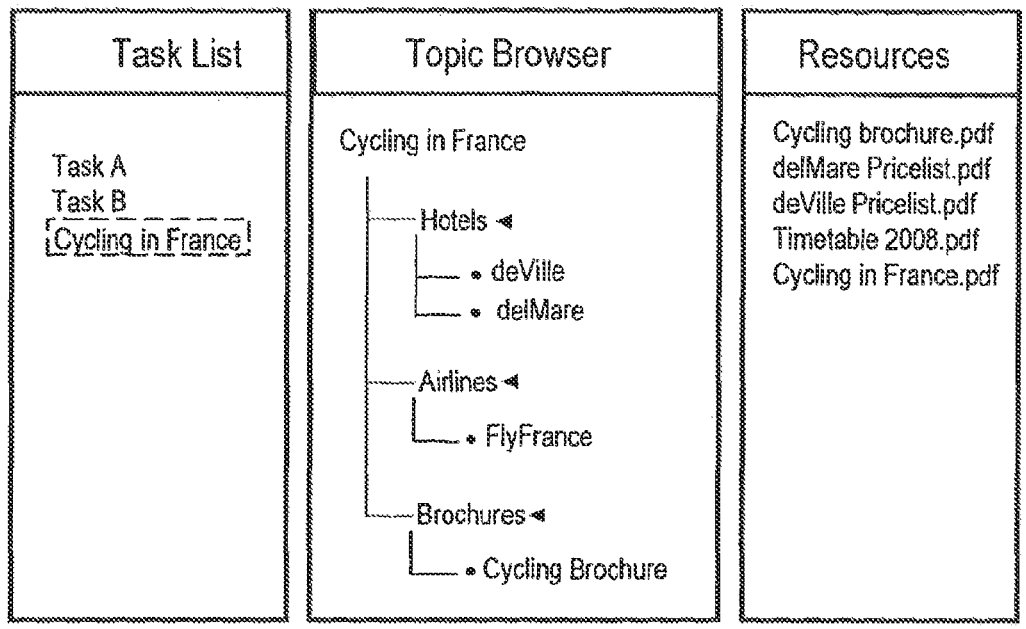
FIGS. 66 and 67 illustrate creating a new task.
Figure 67:
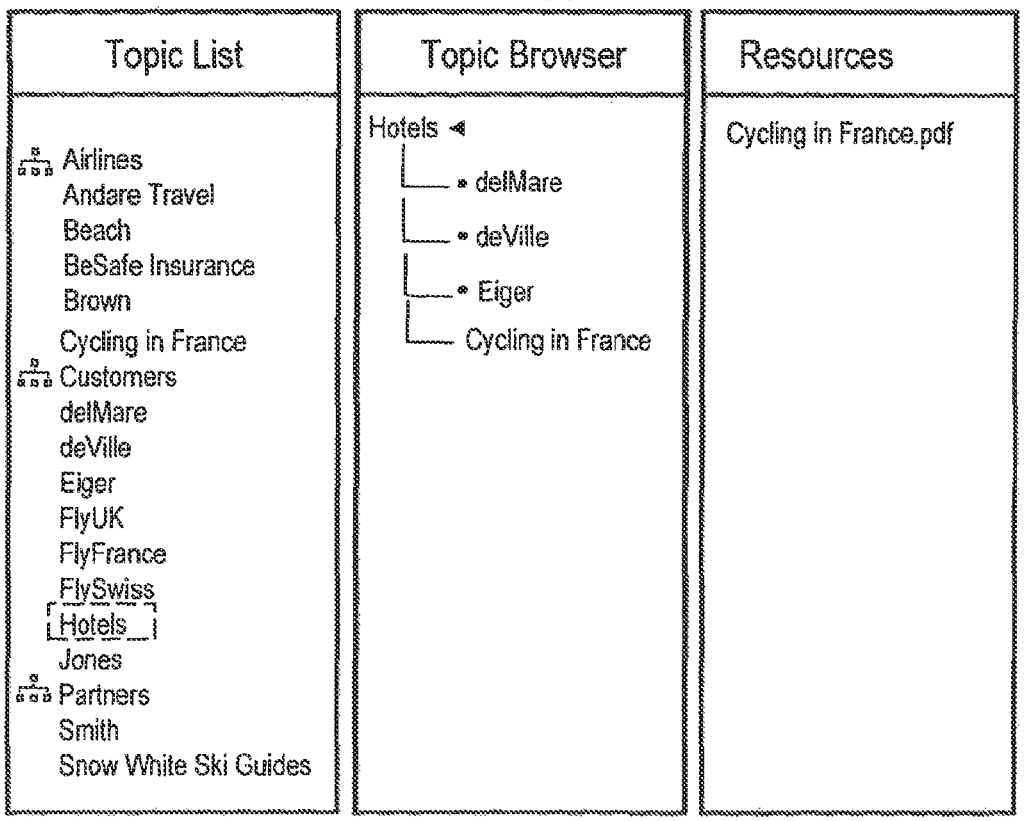

FIGS. 66 and 67 show an example of creating a task. With reference to FIG. 66, User A decides to create a new package holiday brochure on cycling in France. For this he needs information from the flight timetable, last year's brochure and hotel pricelists. He creates a new task called Cycling in France and locates the necessary resources which are then associated to that task. He then creates a resource which by default has the same name as the task. On completion, he saves the resource and the task is deleted. The saved resource is then associated with any topics in the name and any topics that the user chooses from the highest level topics of the resources he has used to compile it e.g. Hotels as shown in FIG. 67.

Figure 68:
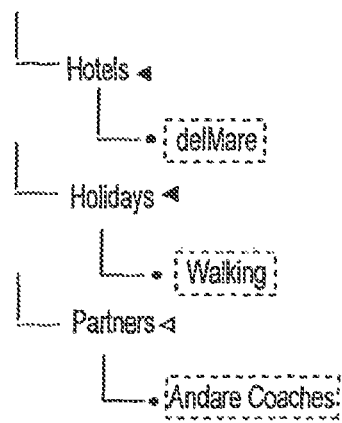
FIG. 68 illustrates associating a resource based in the originator.

In a method in which a topic framework has been created using the method of FIG. 2, an electronic resource can be automatically associated with one or more topics based on the originator of the electronic resource. For example, see FIG. 68. Topics found in an email title or body text can be used to associate that email with topics and display to the user so that the topics sent by any particular user can be viewed. In FIG. 68, Mr. Green has sent several emails which refer to the topics 'Walking, delMare and Andare Coaches' which are topic names in the user's topic framework. Resource associations between these emails and the topics for Mr. Green are created and the user can view emails sent by Mr. Green which have information of relevance.

When a topic framework has been created using the method of FIG. 2, an electronic resource can be automatically associated with one or more topics based on the application of user-defined rules. FIGS. 69 and 70 illustrate examples of this. In FIG. 69 an email is sent from Mr. Green obeys the rule that if the term 'Barber Shop' is in its body or text, then it shall be associated with the topic 'Activities'. Similarly, FIG. 69 shows an email which obeys the rule that if the attachment contains the term 'ABC1234567', then it must be associated with the topic 'Mountain'. A resource association is therefore created.

When a topic framework has been created using the method of FIG. 2, the topic names of the topic framework can be used to identify relevant information within one or more electronic resources. FIG. 71 illustrates an example of this. The document 'Whiteout there.doc' is parsed to find any topics that it contains; that is, any words which correspond with topic names in the user's topic framework. A number of topics are found and an index for those topics within the document is created. For example, the topic 'Skiing is found in a number of locations and page number references for that topic are therefore created in the index.

A system or computer such as a general-purpose computer can be configured or adapted to perform the described methods. In one embodiment the system comprises a processor, memory, and a display. Typically, these are connected to a central bus structure, the display being connected via a display adapter. The system can also comprise one or more input devices (such as a mouse and/or keyboard) and/or a communications adapter for connecting the computer to other computers or networks. These are also typically connected to the central bus structure, the input device being connected via an input device adapter.

In operation the processor can execute computer-executable instructions held in the memory and the results of the processing are displayed to a user on the display. User inputs for controlling the operation of the computer may be received via input device(s).

A computer readable medium (e.g. a carrier disk or carrier signal) having computer-executable instructions adapted to cause a computer to perform the described methods may be provided.

Embodiments of the invention have been described by way of example only. It will be appreciated that variations of the described embodiments may be made which are still within the scope of the invention.

What is claimed:

1. A method for configuring a computer system to provide a set of selectable topic names on an interface for providing access to stored electronic resources by topic name, at least some of which are assigned to named storage sets in a folder structure, the method comprising:
   (1) determining a topic framework for providing the set of topic names for providing access to the electronic resources by topic name on the interface, the topic framework storing topic names, associations between each of the stored electronic resources and one or more topic names, and associations between topic names by:
      (i) determining the topic names for the topic framework from the names assigned to storage sets and the attributes of individual electronic resources by:
         generating one or more topic names from the names assigned to storage sets; and
         generating one or more topic names from attributes of individual electronic resources; and
      (ii) forming the associations between each of the stored electronic resources and one or more topic names by:
         associating electronic resources assigned to a storage set with one or more topic names which were generated from the name of the storage set; and
         associating electronic resources having an attribute or attributes with one or more topic names which were generated from the respective attribute or attributes of the electronic resources;
      (iii) associating one or more topic names with one or more other topic names by:
         generating associations between topic names from the relationships within the folder structure between the respective storage sets from which the topic names were generated;
   (2) storing the topic framework to provide the set of topic names for providing access to the electronic resources by topic name on the interface, wherein the topic framework stores the set of topic names, associations between each of the stored electronic resources and one or more topic names, and associations between topic names; and (3) using the topic framework to configure the computer system to present the interface through which:
(i) a list of topic names is presented through which one or more topic names of the topic framework are selectable;
(ii) when a topic name associated by the topic framework with one or more other topic names is selected, at least a list of the one or more other topic names is presented through which the one or more other topic names are selectable; and
(iii) a group of stored electronic resources associated with a selected one or more topic names is presented so that one or more of the group of electronic resources can be selected for access.

2. A method according to claim 1, wherein the attributes of individual electronic resources are one or more of names of the electronic resources, keywords associated with the electronic resources and content of the electronic resources.

3. A method according to claim 1, wherein generating one or more topic names from the attributes of individual electronic resources comprises:
selecting a word as a topic name on the basis that the word occurs as an attribute for an electronic resource more than once.

4. A method according to claim 1, wherein an individual electronic resource has two or more words in its name and wherein generating one or more topic names from the attributes of the individual electronic resources comprises:
selecting one or more words as a topic name based on weighting the likelihood of using a word which occurs earlier in the name more than the likelihood of using a word which occurs later in the name.

5. A method according to claim 1, wherein the storage sets have a hierarchical relationship, wherein one or more electronic resources are stored in a first storage set lower in the hierarchy than a second storage set, the method further comprising:
generating an association between each of the one or more electronic resources and a first topic name from the name assigned to the first storage set;
generating an association between each of the one or more electronic resources and a second topic name based on the name assigned to the second storage set;
generating an association between the first topic name and the second topic name;
enabling the one or more electronic resources to be accessed through each of a first hierarchical topic view with the first topic name higher in the hierarchy than the second topic name and a second hierarchical topic view with the second topic name higher in the hierarchy than the first topic name.

6. A method according to claim 1, wherein associating one or more topic names with one or more other topic names comprises by:
generating associations between topic names based on multiple topic names being generated from a single attribute of a single electronic resource.

7. A method according to claim 1, wherein associating one or more topic names with one or more other topic names comprises
generating associations between topic names based on a topic name being a subset of the name of another topic name.

8. A method according to claim 1, wherein associations between topic names can be hierarchical associations, the method further comprising:
configuring the computer system to present on the interface the hierarchy between topic names by presenting a list of topic names at a first level in the hierarchy through which one or more topic names in the first level of the hierarchy are selectable to list one or more topic names in the next level of the hierarchy.

9. A method according to claim 8, further comprising:
configuring the computer system to present on the interface for a topic name lower in a hierarchy than other topic names the group of stored electronic resources associated with each of the topic names in the hierarchy.

10. A method according to claim 1, wherein the interface comprises a topic browser and wherein when a topic name associated with one or more topic names is selected the list of the one or more other topic names is presented in the topic browser.

11. A method according to claim 1, wherein one or more electronic resources are not associated with any topic names.

12. A method according to claim 11, further comprising
configuring the computer system to present a list of electronic resources which are not associated with any topic names for a user to determine one or more new topic names for association with one or more of those electronic resources.

13. A method according to claim 1, further comprising:
providing a user with the option to modify the topic framework by one or more of:
adding a topic name to the topic framework;
removing a topic name from the topic framework;
adding an association between an electronic resource and one or more topics names;
removing an association between an electronic resource and one or more topic names;
adding associations between topic names; and
removing associations between topic names.

14. A method according to claim 1, further comprising:
adding new associations and topic names to the topic framework as new electronic resources and named storage sets are added.

15. A method of determining a team topic framework, wherein each of a plurality of users has their own topic framework which has been created in accordance with the method of claim 1, the method comprising:
providing access for the plurality of users to a shared resource location comprising shared electronic resources;
determining for each of the plurality of users which of the electronic resources in the shared resource location are associated with topic names of the user's topic framework and determining a team topic framework by combining these topic names from the plurality of users.

16. A method according to claim 1, further comprising:
creating an organisation topic framework for the organisation's electronic resources by aggregating topic names from individual user's topic frameworks which have been created.

17. A method wherein a topic framework has been created using the method of claim 1, the method further comprising:
partitioning the results of a search based on the topic names of a user's topic framework.

18. A method wherein a topic framework has been created using the method of claim 1, the method further comprising:
using the topic names of a topic structure to change the names or relationships of the named storage set based on the topic names.

19. A method wherein a topic framework has been created using the method of claim 1, the method further comprising:
   using the topic names of the topic framework to identify relevant information within one or more electronic resources.

20. A method according to claim 1, wherein the same topic name is generated from a storage set name and from an attribute of an electronic resource thereby grouping electronic resources together which were not grouped together in the folder structure.

21. A system comprising a memory and a processor, wherein the system provides a set of selectable topic names on an interface for providing access to stored electronic resources by topic name, at least some of which are assigned to named storage sets in a folder structure, wherein the processor is arranged to:
   (1) determine a topic framework for providing a set of topic names for providing access to the electronic resources by topic name on an interface, the topic framework storing topic names, associations between each of the stored electronic resources and one or more topic names, and associations between topic names by:
      (i) determining the topic names for the topic framework from the names assigned to storage sets and the attributes of individual electronic resources by:
         generating one or more topic names from the names assigned to storage sets; and
         generating one or more topic names from attributes of individual electronic resources; and
      (ii) forming the associations between each of the stored electronic resources and one or more topic names by:
         associating electronic resources assigned to a storage set with one or more topic names which were generated from the name of the storage set; and
         associating electronic resources having an attribute or attributes with one or more topic names which were generated from the respective attribute or attributes of the electronic resources;
      (iii) associating one or more topic names with one or more other topic names by:
         generating associations between topic names from the relationships within the folder structure between the respective storage sets from which the topic names were generated;
   (2) storing the topic framework to provide the set of topic names for providing access to the electronic resources by topic name on the interface, wherein the topic framework stores the set of topic names, associations between each of the stored electronic resources and one or more topic names, and associations between topic names; and
   (3) using the topic framework to configure the computer system to present the interface through which:
      (i) a list of topic names is presented through which one or more topic names of the topic framework are selectable;
      (ii) when a topic name associated by the topic framework with one or more other topic names is selected, at least a list of the one or more other topic names is presented through which the one or more other topic names are selectable; and
      (iii) a group of stored electronic resources associated with a selected one or more topic names is presented so that one or more of the group of electronic resources can be selected for access.

22. A non-transitory computer-readable medium having computer-executable instructions, the computer-executable instructions being for configuring a computer system to provide a set of selectable topic names on an interface for providing access to stored electronic resources by topic name, at least some of which are assigned to named storage sets in a folder structure, the computer-executable instructions comprising:
   (1) instructions for determining a topic framework for providing a set of topic names for providing access to the electronic resources by topic name on an interface, the topic framework storing topic names, associations between each of the stored electronic resources and one or more topic names, and associations between topic names by:
      (i) determining the topic names for the topic framework from the names assigned to storage sets and the attributes of individual electronic resources by:
         generating one or more topic names from the names assigned to storage sets; and
         generating one or more topic names from attributes of individual electronic resources; and
      (ii) forming the associations between each of the stored electronic resources and one or more topic names by:
         associating electronic resources assigned to a storage set with one or more topic names which were generated from the name of the storage set; and
         associating electronic resources having an attribute or attributes with one or more topic names which were generated from the respective attribute or attributes of the electronic resources;
      (iii) associating one or more topic names with one or more other topic names by:
         generating associations between topic names from the relationships within the folder structure between the respective storage sets from which the topic names were generated;
   (2) instructions for storing the topic framework to provide the set of topic names for providing access to the electronic resources by topic name on the interface, wherein the topic framework stores the set of topic names, associations between each of the stored electronic resources and one or more topic names, and associations between topic names; and
   (3) instructions for using the topic framework to configure the computer system to present the interface through which:
      (i) a list of topic names is presented through which one or more topic names of the topic framework are selectable;
      (ii) when a topic name associated by the topic framework with one or more other topic names is selected, at least a list of the one or more other topic names is presented through which the one or more other topic names are selectable; and
      (iii) a group of stored electronic resources associated with the one or more topic names is presented so that one or more of the group of electronic resources can be selected for access.

\* \* \* \* \*